(12) United States Patent
Liao et al.

(10) Patent No.: US 11,379,743 B2
(45) Date of Patent: Jul. 5, 2022

(54) RECOMMENDATION SYSTEM

(71) Applicant: SAS Institute Inc., Cary, NC (US)

(72) Inventors: Xuejun Liao, Cary, NC (US); Patrick Nathan Koch, Morrisville, NC (US); Shunping Huang, Cary, NC (US); Yan Xu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/386,853

(22) Filed: Jul. 28, 2021

(65) Prior Publication Data

US 2022/0138605 A1   May 5, 2022

Related U.S. Application Data

(60) Provisional application No. 63/121,751, filed on Dec. 4, 2020, provisional application No. 63/108,640, filed on Nov. 2, 2020.

(51) Int. Cl.
*G06N 5/04* (2006.01)
*G06Q 30/06* (2012.01)
*G06F 17/16* (2006.01)

(52) U.S. Cl.
CPC .............. *G06N 5/043* (2013.01); *G06F 17/16* (2013.01); *G06Q 30/0631* (2013.01)

(58) Field of Classification Search
None
See application file for complete search history.

(56) References Cited

U.S. PATENT DOCUMENTS

| 8,676,736 | B2* | 3/2014 | Pilaszy | G06F 16/951 |
| | | | | 706/46 |
| 10,795,900 | B1 | 10/2020 | Satuluri et al. | |
| 11,100,426 | B1* | 8/2021 | Mishra | G06N 20/00 |
| 2014/0129500 | A1* | 5/2014 | Nice | G06Q 30/0631 |
| | | | | 706/46 |
| 2017/0132509 | A1* | 5/2017 | Li | G06N 3/0454 |

(Continued)

OTHER PUBLICATIONS

Lu et al., "Content-Based Collaborative Filtering for News Topic Recommendation," Proceedings of the Twenty-Ninth AAAI Conference on Artificial Intelligence, 2015, pp. 217-223.

(Continued)

*Primary Examiner* — Alexey Shmatov
*Assistant Examiner* — Beatriz Ramirez Bravo
(74) *Attorney, Agent, or Firm* — Bell & Manning, LLC

(57) ABSTRACT

A computing device determines a recommendation. (A) A first parameter matrix is updated using a first direction matrix and a first step-size parameter value that is greater than one. The first parameter matrix includes a row dimension equal to a number of users of a plurality of users included in a ratings matrix and the ratings matrix includes a missing matrix value. (B) A second parameter matrix is updated using a second direction matrix and a second step-size parameter value that is greater than one. The second parameter matrix includes a column dimension equal to a number of items of a plurality of items included in the ratings matrix. (C) An objective function value is updated based on the first parameter matrix and the second parameter matrix. (D) (A) through (C) are repeated until the first parameter matrix and the second parameter matrix satisfy a convergence test.

30 Claims, 30 Drawing Sheets

(56) References Cited

U.S. PATENT DOCUMENTS

2019/0080383 A1* 3/2019 Garcia Duran ..... G06F 16/9536
2020/0125745 A1* 4/2020 Chen ................... G06F 21/6254
2021/0358007 A1* 11/2021 Zhang ................ G06Q 30/0603

OTHER PUBLICATIONS

Hastie et al., Matrix Completion and Low-Rank SVD via Fast Alternating Least Squares, Journal of Machine Learning Research 16 (2015) 3367-3402.
Robert M. Bell and Yehuda Koren, "Scalable Collaborative Filtering with Jointly Derived Neighborhood Interpolation Weights," Seventh IEEE International Conference on Data Mining, 2007, pp. 43-52.
Basilico et al., "Unifying Collaborative and Content-Based Filtering," Proceedings of the 21$^{st}$ International Conference on Machine Learning, 2004, 8 pages.

\* cited by examiner

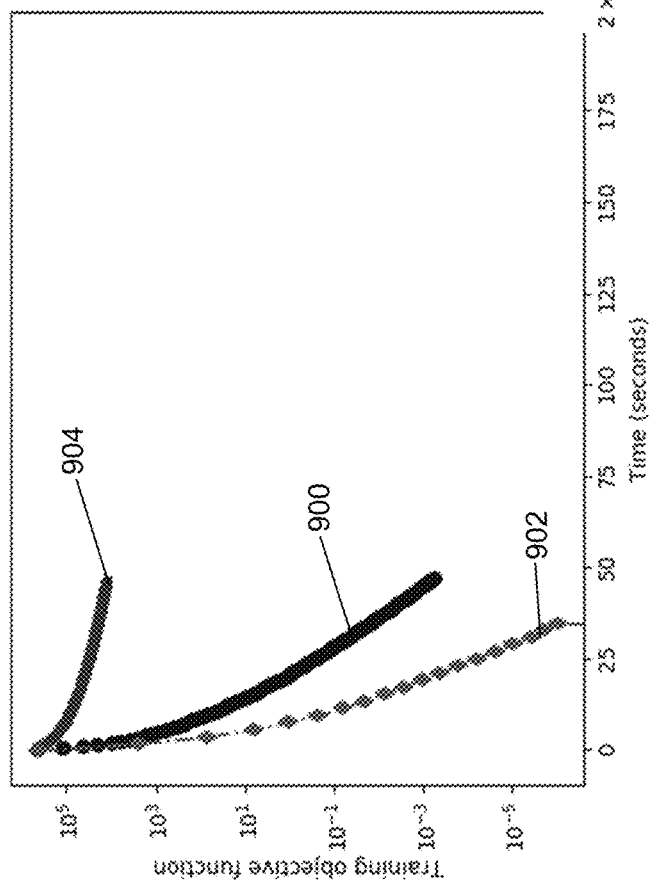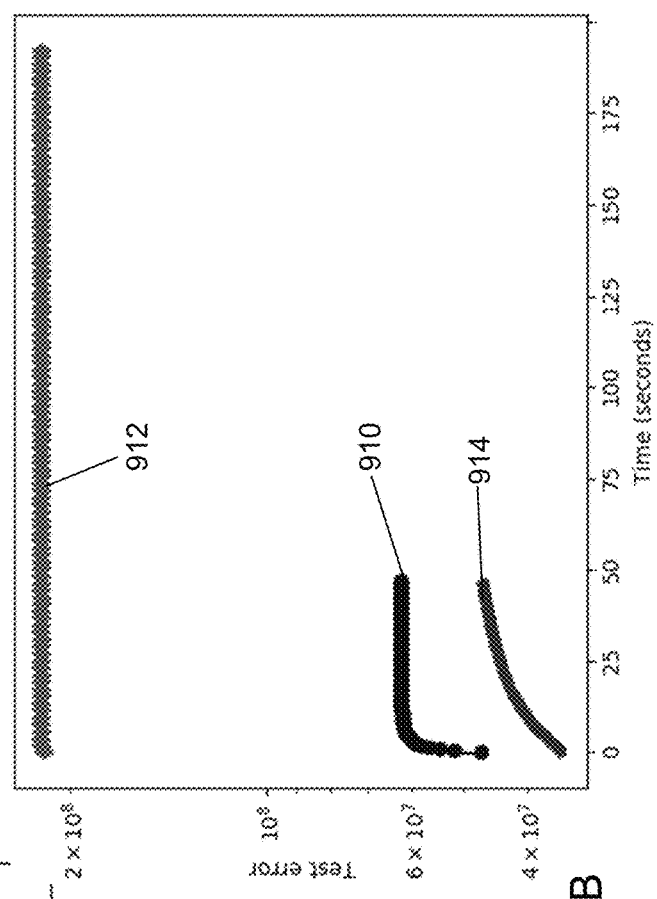
FIG. 9A
FIG. 9B

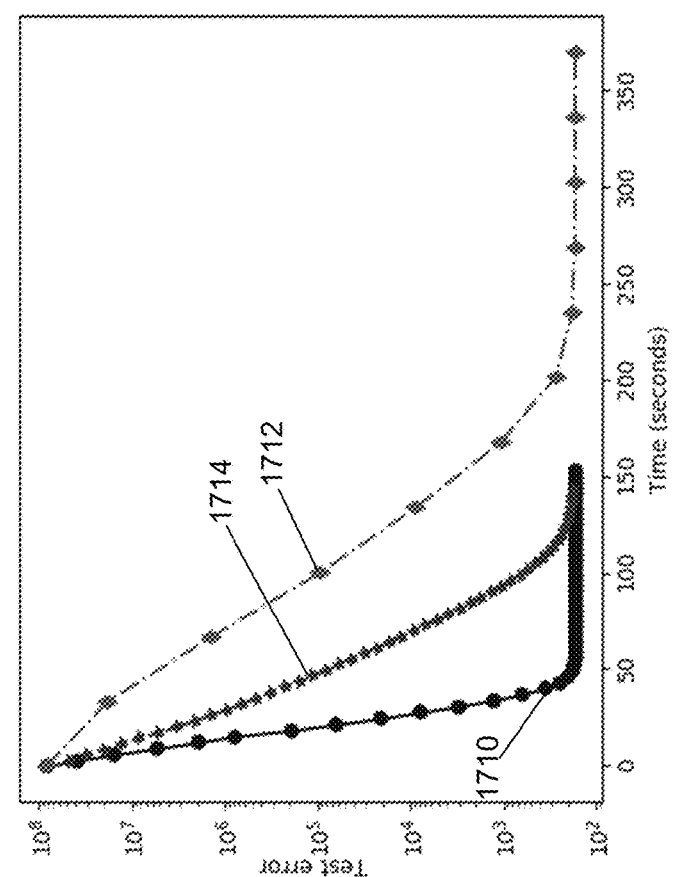
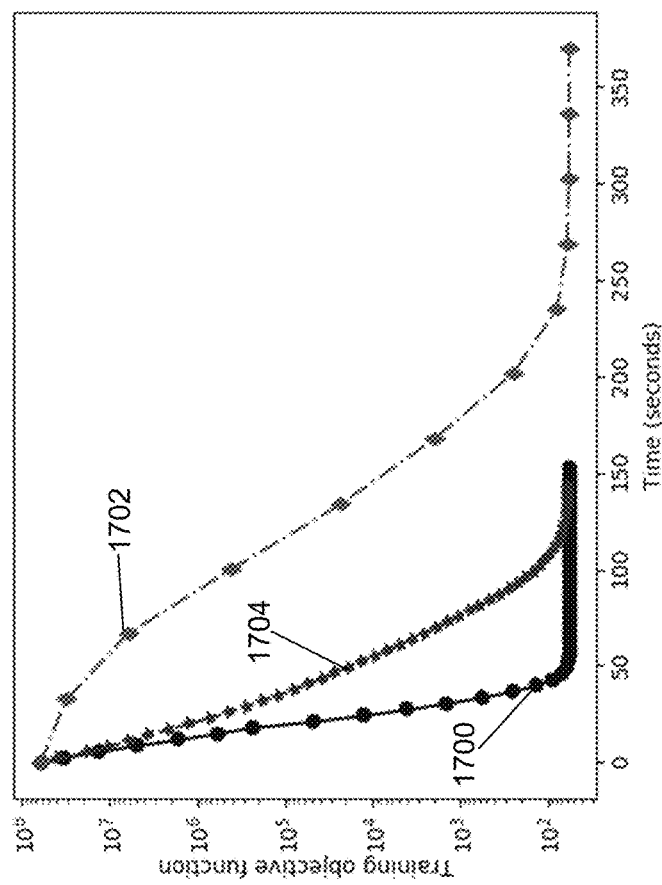
FIG. 17A
FIG. 17B

US 11,379,743 B2

RECOMMENDATION SYSTEM

CROSS-REFERENCE TO RELATED APPLICATIONS

The present application claims the benefit of and priority under 35 U.S.C. § 119(e) to U.S. Provisional Patent Application No. 63/121,751 filed on Dec. 4, 2020, and to U.S. Provisional Patent Application No. 63/108,640 filed on Nov. 2, 2020.

BACKGROUND

As a popular approach to collaborative filtering, matrix factorization (MF) models an underlying rating matrix as a product of two factor matrices, one for users and one for items. The MF model can be learned by alternating least squares (ALS), which updates the two factor matrices alternately, keeping one fixed while updating the other. Although ALS improves the learning objective aggressively in each iteration, it suffers from high computational cost due to the necessity of inverting a separate matrix for each user and item. A softImpute-ALS, described by Trevor Hastie, Rahul Mazumder, Jason D. Lee, and Reza Zadeh in their paper titled Matrix Completion and Low-Rank SVD via Fast Alternating Least Squares and published in the Journal of Machine Learning Research, volume 16, and pages 3367-3402 in 2015, reduces a per-iteration computation significantly using a strategy that requires only two matrix inversions; however, the computational savings leads to a shrinkage in objective improvement.

SUMMARY

In an example embodiment, a non-transitory computer-readable medium is provided having stored thereon computer-readable instructions that, when executed by a computing device, cause the computing device to determine a recommendation. (A) A first parameter matrix is updated using a first direction matrix and a first step-size parameter value that is greater than one. The first parameter matrix includes a row dimension equal to a number of users of a plurality of users included in a ratings matrix and the ratings matrix includes a missing matrix value. (B) A second parameter matrix is updated using a second direction matrix and a second step-size parameter value that is greater than one. The second parameter matrix includes a column dimension equal to a number of items of a plurality of items included in the ratings matrix. (C) An objective function value is updated based on the updated first parameter matrix and the updated second parameter matrix. (D) (A) through (C) are repeated until the updated first parameter matrix and the updated second parameter matrix satisfy a convergence test. The updated first parameter matrix and the updated second parameter matrix are output for use in predicting an interaction rating between a user of the plurality of users and an item of the plurality of items.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine a recommendation.

In an example embodiment, a method of determining a recommendation is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 9A shows a training objective function value comparison with the first data and sixth input parameters in accordance with an illustrative embodiment.

FIG. 9B shows a test error value comparison with the first data and the first input parameters in accordance with an illustrative embodiment.

FIG. 17A shows a training objective function value comparison with the first data and fourteenth input parameters in accordance with an illustrative embodiment.

FIG. 17B shows a test error value comparison with the first data and the first input parameters in accordance with an illustrative embodiment.

DETAILED DESCRIPTION

Figure 1:
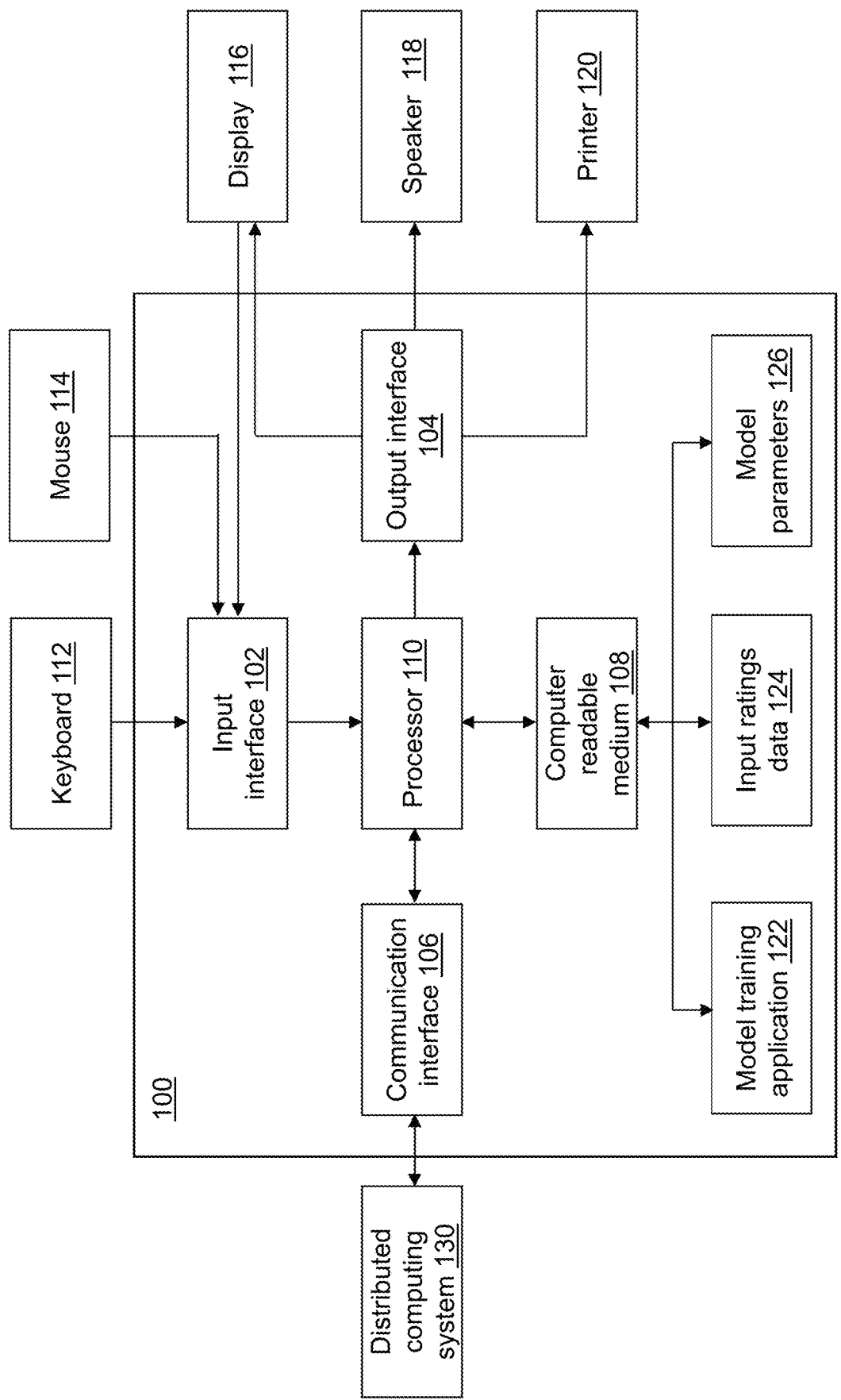
FIG. 1 depicts a block diagram of a recommendation device in accordance with an illustrative embodiment.

Recommendation systems are a technology used ubiquitously in web services including Amazon, Netflix, and Pandora. From the perspective of users, a recommendation system provides a personalized recommendation by helping users find items of interest such as consumer products, friends, jobs, consumer content such as movies, music, books, etc. From the perspective of items, a recommendation system provides a targeted item by identifying potential users that would be interested in the particular item. The information about users, about items, and about user-item interactions constitute the data used to achieve the goal of recommendation systems. Recommendation systems employing user-item interactions alone, without requiring the information of users or items, are based on a technique known as collaborative filtering.

For m users and n items, the interactions can be arranged into an m×n matrix R with $R_{ui}$ representing the interaction between a user u and an item i. For example, $R_{ui}$ may be a numerical value representing a rating that user u gave to item i. Typically, each user rates only a fraction of the items and each item receives ratings from only a fraction of the users making R an incomplete matrix with only a fraction of entries observed and typically many missing matrix values. In this matrix formulation, the goal of recommendation systems, specifically collaborative filtering, becomes predicting the missing entries of R to locate the interesting items or, conversely, the potential users. The formulation has particularly motivated a solution to collaborative filtering based on matrix completion. A major bottleneck of matrix completion is a reliance on a singular value decomposition (SVD), which limits its use in large-scale applications.

An alternative approach to collaborative filtering is matrix factorization (MF), which models the user-item interactions as a product of two factor matrices, R=XY, where rows of X and columns of Y embed users and items, respectively, into a Euclidean space. With this embedding, each user or item is represented by a vector, and a rating entry of r is represented by an inner product of two vectors. These vectors can be considered a feature representation of the users and items. As they are not observed, but rather are inferred from user-item interactions, these vectors are commonly referred to as latent features or factors. Moreover, the latent features of all users and all items may be inferred simultaneously, making it possible to incorporate the benefit of multitask learning (MTL). By the principle of MTL, the feature vector of each user is not only influenced by its own rating history, but also by the rating histories of other users, with the extent of influence dictated by a similarity between the users. For this reason, a user may discover new interesting items from the rating histories of its peers who share similar interests, with the similarity identified from all users' rating histories by learning algorithms.

A widely adopted algorithm for learning MF models is alternating least squares (ALS), which updates the two factor matrices alternately, keeping one fixed while updating the other. Given one matrix, ALS optimizes the other by solving a least squares (LS) problem for each user or item. As the LS solution is optimal, ALS can improve the learning objective aggressively in each iteration, leading to convergence in a small number of iterations. However, different users may have rated different items and, similarly, different items may have been rated by different users; thus, the LS problem for a user or item generally has a distinct Hessian matrix that differs from those of other users or items. As an LS solution requires inverting the Hessian matrix, this entails a separate matrix inversion for each user or item, leading to a high computational cost for each iteration of ALS.

The softImpute-ALS algorithm reduces the per-iteration computation of ALS using a strategy that requires only two matrix inversions. Instead of directly solving a LS problem for each user or item, softImpute-ALS first completes the rating matrix R by imputing the missing ratings with the predictions provided by a current model that is the model most recently updated. The completed R matrix gives rise to a surrogate objective function, which is optimized by softImpute-ALS to yield a solution for the original objective. With the surrogate objective function, the LS problems for all users or items now share the same Hessian matrix, which can be solved with a single matrix inversion. However, the optimal solution for the surrogate objective function is only sub-optimal for the original objective function. Therefore, improvement of the original objective function in a single iteration of softImpute-ALS can be significantly smaller than that of ALS.

A recommendation application 122 overcomes the drawback of softImpute-ALS while still maintaining its low cost of computation per iteration. Recommendation application 122 considers that factor matrices may include fixed columns or rows allowing bias terms and/or linear models to be incorporated into the machine learning model. Recommendation application 122 first performs data augmentation, which is an equivalent to the imputation step of softImpute-ALS. However, recommendation application 122 further constructs a set of solutions with the softImpute-ALS solution included in the set as a special case with a step-size value of one. The solutions are parameterized by a scalar that plays the role of a step-size in a gradient descent optimization. The step-size is optimized by recommendation application 122 to find a solution that maximizes the original objective function. The optimization guarantees a larger improvement of the original objective function compared to the improvement achieved using softImpute-ALS helping to alleviate the issue of a slow progress per iteration and to speed up convergence. The optimal step-size can be obtained in closed-form, and its calculation does not introduce significant additional cost of computation. Thus, recommendation application 122 has almost the same per-iteration computational complexity as softImpute-ALS in the big-O notation. With the low cost per iteration and more aggressive improvement of the learning objective function, recommendation application 122 blends the advantage of softImpute-ALS into that of ALS, thereby achieving a high performance-to-cost ratio. Experimental results using two different datasets are described herein to demonstrate the benefits of recommendation application 122 over ALS and softImpute-ALS in terms of generalization performance and computation time.

Referring to FIG. 1, a block diagram of recommendation device 100 is shown in accordance with an illustrative embodiment. Recommendation device 100 may include an input interface 102, an output interface 104, a communication interface 106, a non-transitory computer-readable medium 108, a processor 110, recommendation application 122, input ratings data 124, and model parameters 126. Fewer, different, and/or additional components may be incorporated into recommendation device 100.

Input interface 102 provides an interface for receiving information from the user or another device for entry into recommendation device 100 as understood by those skilled in the art. Input interface 102 may interface with various input technologies including, but not limited to, a keyboard 112, a mouse 114, a display 116, a track ball, a keypad, one or more buttons, etc. to allow the user to enter information into recommendation device 100 or to make selections presented in a user interface displayed on display 116.

The same interface may support both input interface 102 and output interface 104. For example, display 116 comprising a touch screen provides a mechanism for user input and for presentation of output to the user. Recommendation device 100 may have one or more input interfaces that use the same or a different input interface technology. The input interface technology further may be accessible by recommendation device 100 through communication interface 106.

Output interface 104 provides an interface for outputting information for review by a user of recommendation device 100 and/or for use by another application or device. For example, output interface 104 may interface with various output technologies including, but not limited to, display 116, a speaker 118, a printer 120, etc. Recommendation device 100 may have one or more output interfaces that use the same or a different output interface technology. The output interface technology further may be accessible by recommendation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Recommendation device 100 may have one or more communication interfaces that use the same or a different communication interface technology. For example, recommendation device 100 may support communication using an Ethernet port, a Bluetooth antenna, a telephone jack, a USB port, etc. Data and/or messages may be transferred between recommendation device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Recommendation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Recommendation device 100 also may have one or more drives that support the loading of a memory media such as a CD, DVD, an external hard drive, etc. One or more external hard drives further may be connected to recommendation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Recommendation device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Recommendation application 122 performs operations associated with defining model parameters 126 from data stored in input ratings data 124. Model parameters 126 may be used to provide a recommendation to one or more users regarding one or more items or to provide a recommendation to an entity such as a business offering the one or more items regarding one or more users. Some or all of the operations described herein may be embodied in recommendation application 122. The operations may be implemented using hardware, firmware, software, or any combination of these methods.

Referring to the example embodiment of FIG. 1, recommendation application 122 is implemented in software (comprised of computer-readable and/or computer-executable instructions) stored in computer-readable medium 108 and accessible by processor 110 for execution of the instructions that embody the operations of recommendation application 122. Recommendation application 122 may be written using one or more programming languages, assembly languages, scripting languages, etc. Recommendation application 122 may be integrated with other analytic tools. As an example, recommendation application 122 may be part of an integrated data analytics software application and/or software architecture such as that offered by SAS Institute Inc. of Cary, N.C., USA. Merely for illustration, recommendation application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Recommendation application 122 may be implemented as a Web application. For example, recommendation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input ratings data 124 may include ratings data captured for a plurality of users and a plurality of items as a function of time. For example, the ratings data may be a rating provided by a user with regard to an item of the plurality of items. The data stored in input ratings data 124 may be captured at different time points periodically, intermittently, when a rating is generated, etc. One or more columns of input ratings data 124 may include a time and/or date value.

The data stored in input ratings data 124 may be received directly or indirectly from a user device such as user device 2900 (shown referring to FIG. 29) and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input ratings data 124 may be generated as part of the Internet of Things (IoT), where things (e.g., machines, devices, phones, sensors) can be connected to networks and the data from these things collected and processed within the things and/or external to the things before being stored in input ratings data 124.

Input ratings data 124 may be stored on computer-readable medium 108 or on one or more computer-readable media of distributed computing system 130 and accessed by recommendation device 100 using communication interface 106, input interface 102, and/or output interface 104. Input ratings data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input ratings data 124 may be stored using various data structures as known to those skilled in the art including one or more files of a file system, a relational database, one or more tables of a system of tables, a structured query language database, etc. on recommendation device 100 or on distributed computing system 130. Recommendation device 100 may coordinate access to input ratings data 124 that is distributed across distributed computing system 130 that may include one or more computing devices. For example, input ratings data 124 may be stored in a cube distributed across a grid of computers as understood by a person of skill in the art. As another example, input ratings data 124 may be stored in a multi-node Hadoop® cluster. For instance, Apache™ Hadoop® is an open-source software framework for distributed computing supported by the Apache Software Foundation. As another example, input ratings data 124 may be stored in a cloud of computers and accessed using cloud computing technologies, as understood by a person of skill in the art. The SAS® LASR™ Analytic Server may be used as an analytic platform to enable multiple users to concurrently access data stored in input ratings data 124. The SAS Viya open, cloud-ready, in-memory architecture also may be used as an analytic platform to enable multiple users to concurrently access data stored in input ratings data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
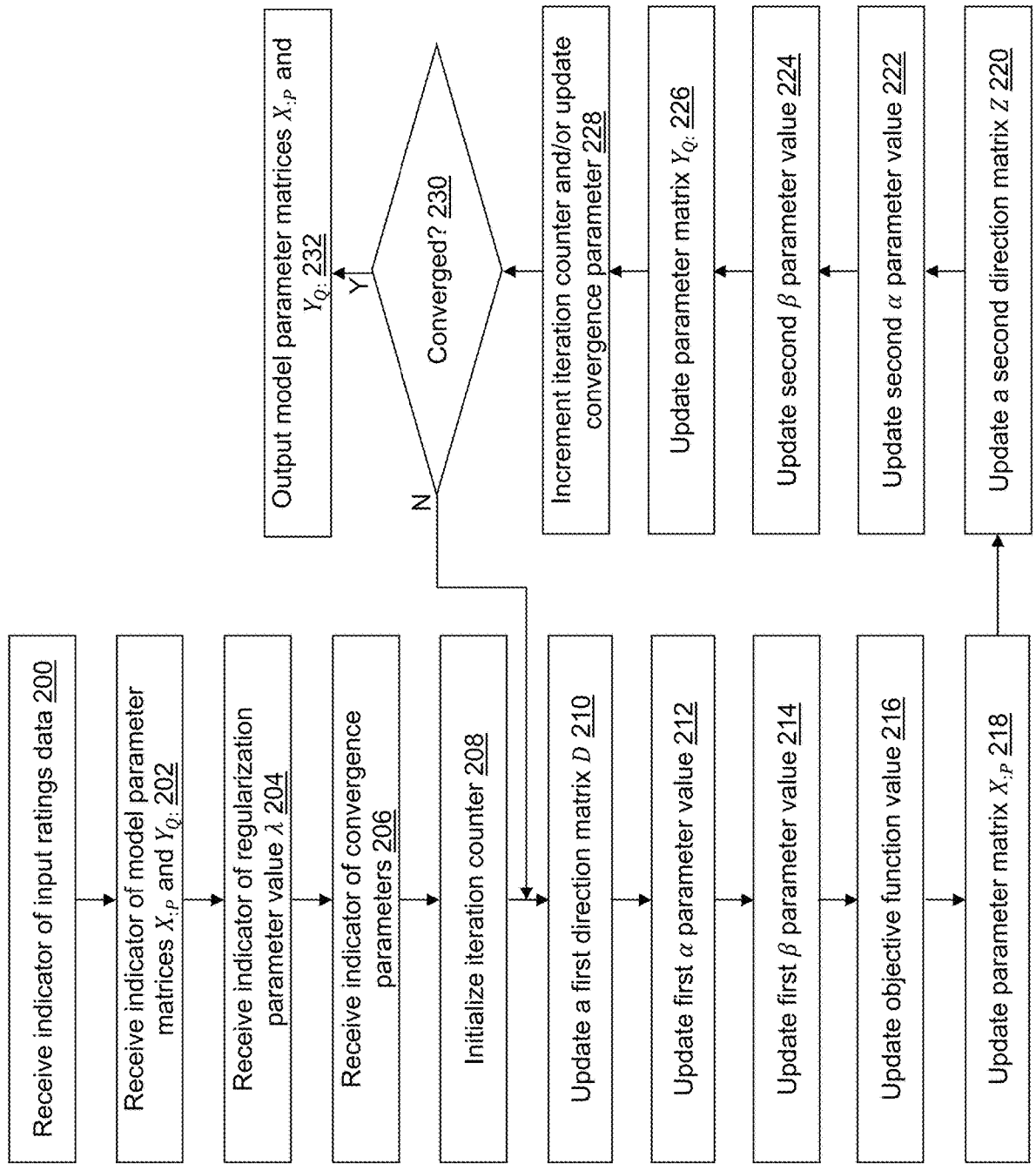
FIG. 2 depicts a flow diagram illustrating examples of operations performed by a recommendation application of the recommendation device of FIG. 1 in accordance with an illustrative embodiment.

Referring to FIG. 2, example operations associated with recommendation application 122 are described. Additional, fewer, or different operations may be performed depending on the embodiment of recommendation application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute recommendation application 122, which causes presentation of a first user interface window, which may include a plurality of menus and selectors such as drop-down menus, buttons, text boxes, hyperlinks, etc. associated with recommendation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by recommendation application 122. The operations of recommendation application 122 further may be performed in parallel using a plurality of threads and/or a plurality of worker computing devices.

In an operation 200, a first indicator may be received that indicates input ratings data 124. For example, the first indicator indicates a location and a name of input ratings data 124. As an example, the first indicator may be received by recommendation application 122 after selection from a user interface window or after entry by a user into a user interface window. In an alternative embodiment, input ratings data 124 may not be selectable. For example, a most recently created dataset may be used automatically.

In an operation 202, a second indicator may be received that indicates initial parameter matrices $X_{:P}$ and $Y_{Q:}$. As an example, the second indicator may be received by recommendation application 122 after selection from a user interface window or after entry by a user into a user interface window. In an alternative embodiment, the second indicator may not be received. For example, a default value may be stored, for example, in computer-readable medium 108 and used automatically. In another alternative embodiment, the parameter matrices $X_{:P}$ and $Y_{Q:}$ may not be selectable. Instead, fixed, predefined values may be used.

Figure 3:
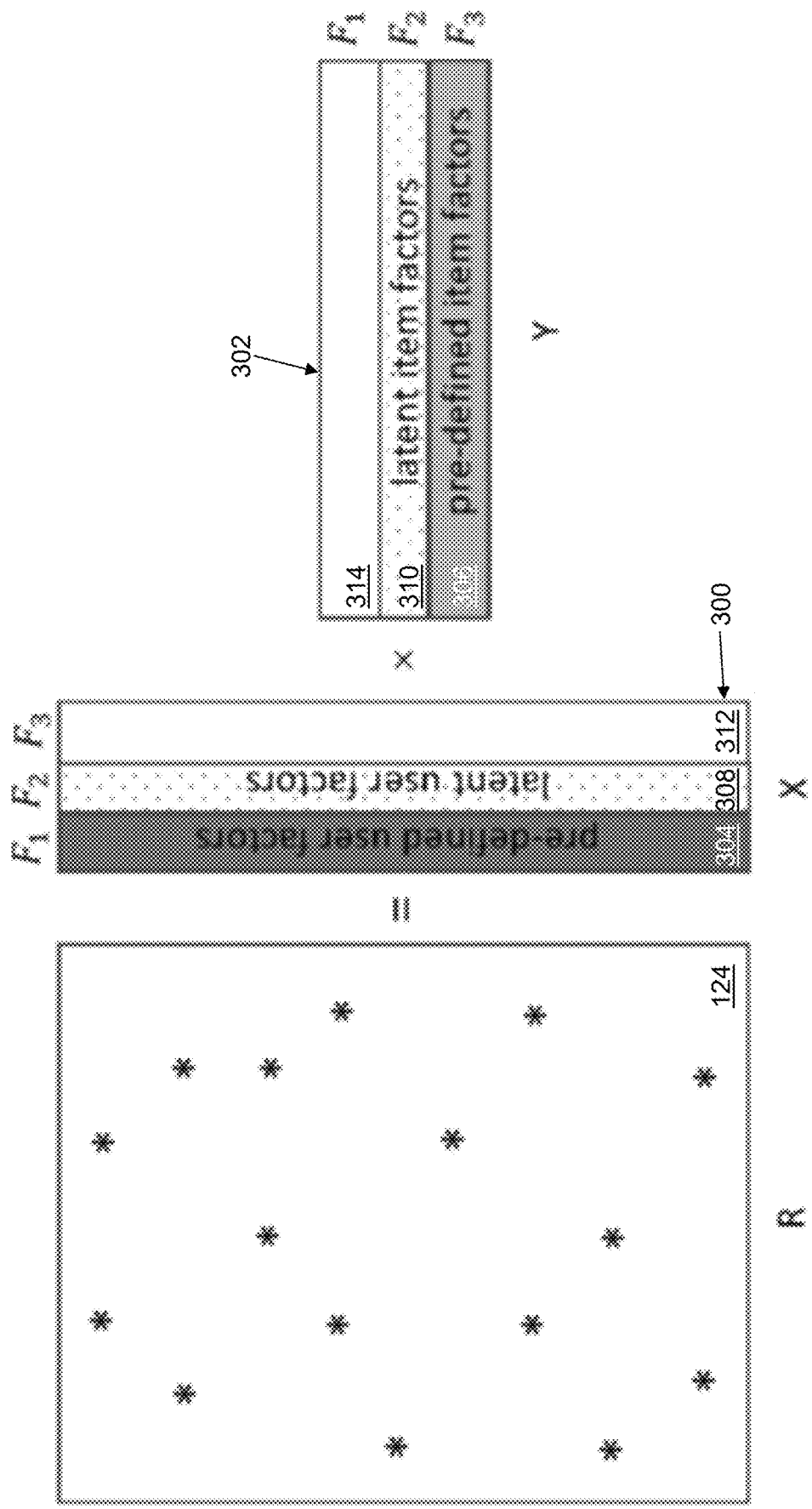
FIG. 3 depicts a sub-model structure for determining recommendations based on content-based and/or collaborative filtering in accordance with an illustrative embodiment.

Referring to FIG. 3, a general form of MF may be defined using R=XY, where R indicates input ratings data 124, X indicates a user matrix 300, and Y indicates an items matrix 302. R is an m×n matrix with $R_{ui}$ representing an interaction between a user u and an item i, where m is a number of the plurality of users, and n is a number of the plurality of items. A "*" included in the graphic of input ratings data 124 indicates an observed ratings entry where the remaining entries are missing. User matrix 300 can be defined as $X=[X_{:F_1}, X_{:F_2}, X_{:F_3}]$, and items matrix 302 can be defined as $[Y=Y_{F_1:}, Y_{F_2:}, Y_{F_3:}]$, where $F_1$, $F_2$ and $F_3$ form a partition $F_1 \cup F_2 \cup F_3 = \{1, 2, \ldots, |F_1|+|F_2|+|F_3|\}$ meaning $F_1$, $F_2$ and $F_3$ are mutually exclusive. The partition results in a three-term representation of R defined using $$R = X_{:F_1}Y_{F_1:} + X_{:F_2}Y_{F_2:} + X_{:F_3}Y_{F_3:}.$$

Each term is a sub-model. The first term $X_{:F_1}Y_{F_1:}$ is a linear regression model, with $X_{:F_1}$ the pre-defined user factors 304, and $Y_{F_1:}$ associated item regression parameters 314 for the pre-defined user factors 304. The second term $X_{:F_2}Y_{F_2:}$ is a standard MF model, with $X_{:F_2}$ the latent user factors 308 of the users and $Y_{F_2:}$ the latent item factors 310 of the items. The third term $X_{:F_3}Y_{F_3:}$ is a linear regression model, with $Y_{:F_3}$ the pre-defined item factors 306 and $X_{:F_3}$ the associated user regression parameters 312 for the pre-defined item factors 306.

$X_{:F_1}$ and/or $Y_{F_3:}$ are pre-defined and fixed resulting in a model with partially defined factors. Bias terms and/or linear models may be incorporated into the MF model and their definition adjusted during training. $R = XY = X_{:F_1}Y_{F_1:} + X_{:F_2}Y_{F_2:} + X_{:F_3}Y_{F_3:}$ can be learned by algorithms including ALS, softImpute-ALS, and recommendation application 122 in the same way MF is learned, except for additional notations used to designate adjustable factors versus non-adjustable factors $X_{:F_1}$ and $Y_{F_3:}$. Use of $R = XY = X_{:F_1}Y_{:F_1:} + X_{:F_2}Y_{F_2:} + X_{:F_3}Y_{F_3:}$, referred to as MF-PDF, has the practical advantage of updating bias terms along with the latent factors and can be used to incorporate engineered features (as opposed to inferred features) of users or items into collaborative filtering.

When $|F_1| = |F_3| = 0$, the model is a standard MF model. In an illustrative embodiment, $|F_1| = |F_3| = 1$ with $X_{:F_1}$ a column vector of all one's and $Y_{F_3:}$ a row vector of all ones. In this special case, the regression parameters $X_{:F_3}$ become the biases of the users and $Y_{F_1:}$ the biases of the items. In alternative embodiments, $X_{:F_1}$ and $Y_{F_3:}$ can be used to hold engineered features of users and items, respectively.

Although MF-PDF retains the basic structure of MF, MF-PDF has an important difference from the standard MF model: the two matrices X and Y are only partially adjustable and the adjustable part of X is not perfectly aligned with that of Y. More specifically, $X_{:P}$ can be defined as the adjustable part of X while $Y_{Q:}$ can be defined as the adjustable part of Y, where $P = F_2 \cup F_3$ and $Q = F_1 \cup F_2$. $P \neq Q$ unless $|F_1| = |F_3| = 0$. Assuming, $|F_1|$ or $|F_3| \neq 0$, $X_{:P}$ and $Y_{Q:}$ constitute the parameters of MF-PDF that are to be estimated. $F_1$ and $F_3$ store the indices for a linear model on user or item features. $F_2$ stores indices for latent factors in X and Y.

F, P, and Q are sets of integers. For notation, a cardinality of a set is indicated by | |, a complement of a set is indicated with a bar over the top such as $\overline{P}$, which indicates a complement of P, $R_{u:}$ indicates a $u^{th}$ row of R, $R_{:i}$ indicates an $i^{th}$ column of R, $X_{:F_1}$ is a sub-matrix of X obtained by extracting the columns indexed by the elements of $F_1$, $Y_{F_2:}$ is a sub-matrix of Y obtained by extracting the rows indexed by the elements of $F_2$, $X_{uP}$ indicates a $u^{th}$ row of $X_{:P}$, and $Y_{Pi}$ indicates an $i^{th}$ column of $Y_{P:}$.

Referring again to FIG. 2, in an operation 204, a third indicator of a regularization parameter value may be received. As an example, the third indicator may be received by recommendation application 122 after selection from a user interface window or after entry by a user into a user interface window. In an alternative embodiment, the third indicator may not be received. For example, a default value may be stored, for example, in computer-readable medium 108 and used automatically. In another alternative embodiment, the value of the regularization parameter value may not be selectable. Instead, a fixed, predefined value may be used. For illustration, a default value of the regularization parameter value λ may be λ=0.01 though other values may be used subject to $0 < \lambda < \infty$.

In an operation 206, a fourth indicator of one or more convergence parameter values may be received. For illustration, the one or more convergence parameter values may include one or more of a maximum number of iterations $T_x$, a first convergence threshold value $c_{T1}$, and a second convergence threshold value $c_{T2}$. The first convergence threshold value $c_{T1}$ may indicate a threshold value for an objective function, and second convergence threshold value $c_{T2}$ may indicate a threshold value for a change in a value of the objective function. In an alternative embodiment, the fourth indicator may not be received. For example, default value(s) may be stored, for example, in computer-readable medium 108 and used automatically. In another alternative embodiment, the value(s) of the maximum number of iterations $T_x$, the first convergence threshold value $c_{T1}$, and/or the second convergence threshold value $c_{T2}$ may not be selectable. Instead, a fixed, predefined value(s) may be used. For illustration, a default value for the maximum number of iterations $T_x$ may be $T_x = 100$ though other values may be used. For illustration, a default value for the first convergence threshold value $c_{T1}$ may be $c_{T1} = 0.1$ though other values may be used. For illustration, a default value for the second convergence threshold value $c_{T2}$ may be $c_{T2} = 0.01$ though other values may be used.

In an operation 208, an iteration counter t is initialized, for example, using t=0, when the maximum number of iterations $T_x$ is used as part of a convergence test.

In an operation 210, a first direction matrix D is updated using $D = [(R-XY)Y_{P:}^T - \lambda X_{:P}](\lambda I + Y_{P:}Y_{P:}^T)^{-1}$, where I is an identity matrix having dimension $(|F_2|+|F_3|)$ by $(|F_2|+|F_3|)$, T indicates a transpose, and the first direction matrix D has dimension m by $(|F_2|+|F_3|)$. $X_{:\overline{P}}$ holds the pre-defined user factors such as a column of m ones, and $Y_{\overline{Q}:}$ holds the pre-defined item factors such as a row of n ones. However, $[X_{:\overline{P}}, X_{:P}] = X$ and $[Y_{\overline{Q}:}, Y_{Q:}] = Y$ so $R - X_{:\overline{P}}Y_{P:} - X_{:P}Y_{P:} = R - XY$.

In an operation 212, a first α parameter value $\alpha_1$ is updated using $\alpha_1 = \Sigma_{(u,i) \in \Omega}(R_{ui} - X_{u:}Y_{:i})(D_{u:}Y_{Pi}) - \lambda tr(X_{:P}^T D)$, where $\Omega = \{(u, i): R_{ui}$ is observed$\}$, and tr indicates a trace.

In an operation 214, a first β parameter value $\beta_1$ is updated using $\beta_1 = \Sigma_{(u,i) \in \Omega}(D_{u:}Y_{Pi})^2 - \lambda \|D\|^2$ where $\| \|$ indicates a Euclidean distance computation.

In an operation 216, an objective function value g is updated using $g = \Sigma_{(u,i) \in \Omega}(R_{ui} - X_{u:}Y_{:i})^2 + \lambda(\|X_{:P}\|^2 + \|Y_{Q:}\|^2)$.

In an operation 218, the parameter matrix $X_{:P}$ is updated using $X_{:P} = X_{:P} + \eta_1 D$, where $\eta_1$ is a first step-size parameter value computed using $$\eta_1 = \frac{\alpha_1}{\beta_1} \geq 1.$$

In an operation 220, a second direction matrix Z is updated using $Z = (\lambda I + X_{:Q}^T X_{:Q})^{-1}[X_{:Q}^T(R-XY) - \lambda Y_{Q:}]$, where the second direction matrix Z has dimension $(|F_1|+|F_2|)$ by n.

In an operation 222, a second α parameter value $\alpha_2$ is updated using $\alpha_2 = \Sigma_{(u,i) \in \Omega}(R_{ui} - X_{u:}Y_{:i})(X_{uQ}Z_{:i}) - \lambda tr(Y_{Q:}Z^T)$.

In an operation 224, a second β parameter value $\beta_2$ is updated using $\beta_2 = \Sigma_{(u,i) \in \Omega}(X_{uQ}Z_{:i})^2 - \lambda \|Z\|^2$.

In an operation 226, the parameter matrix $Y_{Q:}$ is updated using $Y_{Q:} = Y_{Q:} + \eta_2 Z$, where $\eta_2$ is a second step-size parameter value computed using $$\eta_2 = \frac{\alpha_2}{\beta_2} \geq 1.$$

In an operation 228, the iteration counter t is incremented, for example, using t=t+1 when the maximum number of iterations $T_x$ is used as part of the convergence test. When the second convergence threshold value $c_{T2}$ is used as part of the convergence test, a second convergence parameter is computed using $c_2 = g - g'$, where g' is the objective function value from a previous iteration of 216.

In an operation 230, a determination is made concerning whether the parameter matrices $X_{:P}$ and $Y_{Q:}$ have converged. When the parameter matrices $X_{:P}$ and $Y_{Q:}$ have converged, processing continues in an operation 232. When the parameter matrices $X_{:P}$ and $Y_{Q:}$ have not converged, processing continues in operation 210. For illustration, the parameter matrices $X_{:P}$ and $Y_{Q:}$ have converged when $t > T_x$, and/or when $g < c_{T1}$, and/or when $c_2 < c_{T2}$ depending on which of the one or more convergence parameters is selected for use in operation 206.

In operation 232, the parameter matrices $X_{:P}$ and $Y_{Q:}$ are output. For example, the parameter matrices $X_{:P}$ and $Y_{Q:}$ may be output to model parameters 126. The pre-defined user factors 304, $X_{:P_1}$, the pre-defined item factors 306, $Y_{F_3:}$, the associated user regression parameters 312 for the pre-defined item factors 306, $X_{:F_3}$, and the associated item regression parameters 314 for the pre-defined user factors 304, $Y_{F_1:}$, further may be output. In addition, or in the alternative, a predicted ratings matrix $XY = X_{:F_1} Y_{F_1:} + X_{:P} Y_{P:} = X_{:F_3} Y_{F_3:} + X_{:Q} Y_{Q:}$ may be output. $X_{:F_1}$ the pre-defined user factors 304, and $Y_{F_1:}$ associated item regression parameters 314 for the pre-defined user factors 304.

Relative to softImpute-ALS, recommendation application 122 computes $\eta_1$ from $\alpha_1$ and $\beta_1$ to update $X_{:P}$ and $\eta_2$ from $\alpha_2$ and $\beta_2$ to update $Y_{Q:}$. Effectively, for softImpute-ALS $\eta_1 = \eta_2 = 1$. A comparative study of recommendation application 122 versus softImpute-ALS and ALS was performed using two different datasets: 1) a synthetic dataset and 2) a movie dataset. All three algorithms were implemented in C and executed on the same computing device in each experiment.

A 1000×2000 rating matrix was synthesized as $R = X_{:F_2} Y_{F_2:} + 0.01 N$, where the entries of $X_{:F_2}$, $Y_{F_2:}$, and N were all independently drawn from a standard normal distribution. Thus, the synthetic data follows the MF-PDF model with m=1000, n=2000, $|F_1|=|F_3|=1$, and additive white Gaussian noise. The predefined factors were set to zero. The sampler $\Omega$ included the first $|\Omega|$ elements of a random permutation of $\Omega_0 \triangleq \{(u, i): u=1 \ldots m, i=1 \ldots n\}$, with $\{R_{ui}:(u, i) \in \Omega\}$ used as training data and $\{R_{ui}:(u, i) \in \overline{\Omega}\}$ as test data, where $\overline{\Omega}$ is the compliment of $\Omega$ in $\Omega_0$, and a universal set is shorthanded as ":". The factor matrices $X_{:F_2}$ and $Y_{F_2:}$ were learned by minimizing the objective function $g(X_{:P}, Y_{Q:}) = \Sigma_{(u,i) \in \Omega}(R_{ui} - X_{u:} Y_{:i})^2 + \lambda(\|X_{:P}\|^2 + \|Y_{Q:}\|^2)$ with $\lambda = 0.01$. Since $|F_1|=|F_3|=1$, $P=Q=F_2$ with $\overline{P}$ and $\overline{Q}$ being null sets. It was assumed that the truth of $|F_2|$ was known and not tuned.

By construction, R is a rank-$|F_2|$ matrix plus Gaussian noise and hence its rank is approximately $|F_2|$. Since the size of R and the noise level was fixed, the complexity of R was mainly determined by $|F_2|$. The more complex R was, the more training samples it requires to obtain a good estimate of $X_{:F_2}$ and $Y_{F_2:}$. Motivated by this, $|F_2|$ and $|\Omega|$ were varied to examine the performance of the three algorithms to identify their merits and drawbacks in different scenarios and provide insight into the algorithms.

For a given setting of ($|F_2|$, $|\Omega|$), each learning algorithm was run on the training data. At each iteration of each algorithm, the cumulative squared error was computed on test data, $\Sigma_{(u,i) \in \overline{\Omega}}(R_{ui} - X_{uF_2} Y_{F_2 i})^2$, using it as a performance metric to evaluate how well the model obtained at that iteration generalized to data unseen in training and to examine how fast each algorithm converged while learning.

Figure 4A:
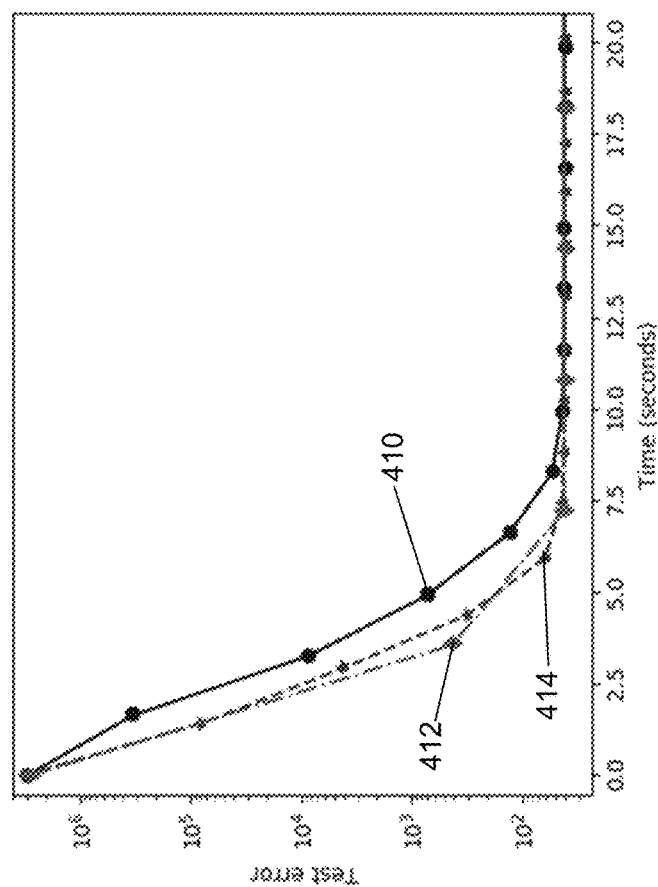
FIG. 4A shows a training objective function value comparison with first data and first input parameters in accordance with an illustrative embodiment.
Figure 4B:
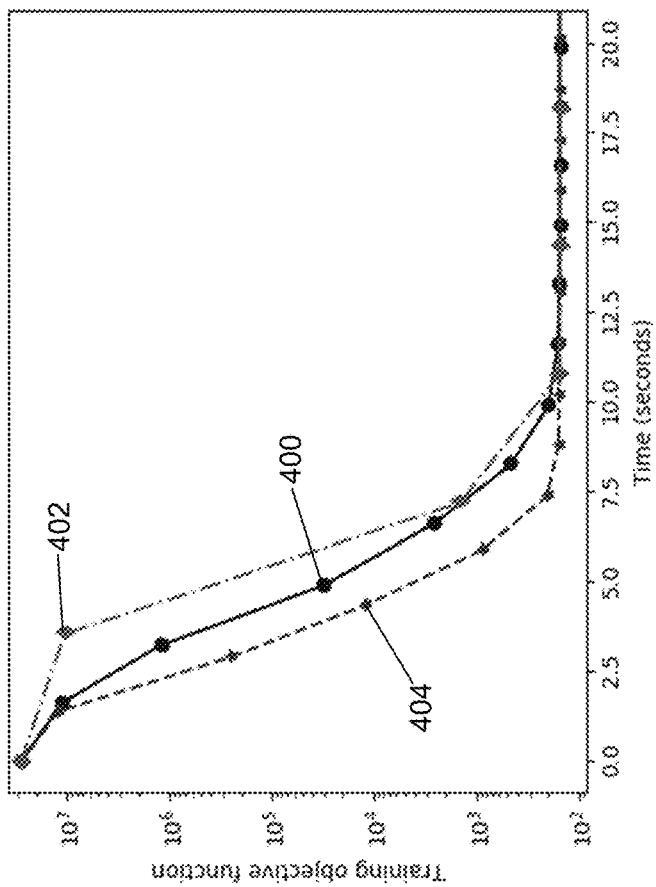
FIG. 4B shows a test error value comparison with the first data and the first input parameters in accordance with an illustrative embodiment.

The results are summarized for the synthetic data in FIGS. 4A through 21B. Referring to FIG. 4A, a comparison of a training objective function as a function of time is shown for $$|F_2| = 18 \text{ and } \frac{|\Omega|}{mn} = 0.8$$

and $n_{feat} = |F_1| + |F_2| + |F_3| = 20$. A first curve 400 was generated using recommendation application 122; a second curve 402 was generated using ALS; and a third curve 404 was generated using softImpute-ALS. Referring to FIG. 4B, a comparison of a test error as a function of time is shown for $$|F_2| = 18 \text{ and } \frac{|\Omega|}{mn} = 0.8.$$

A fourth curve 410 was generated using recommendation application 122; a fifth curve 412 was generated using ALS; and a sixth curve 414 was generated using softImpute-ALS.

Figure 5A:
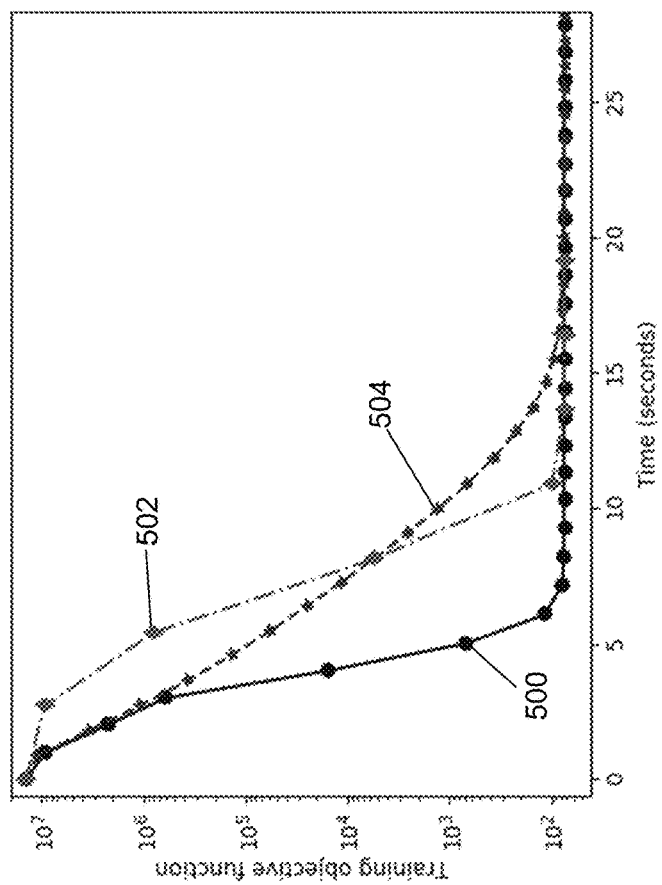
FIG. 5A shows a training objective function value comparison with the first data and second input parameters in accordance with an illustrative embodiment.
Figure 5B:
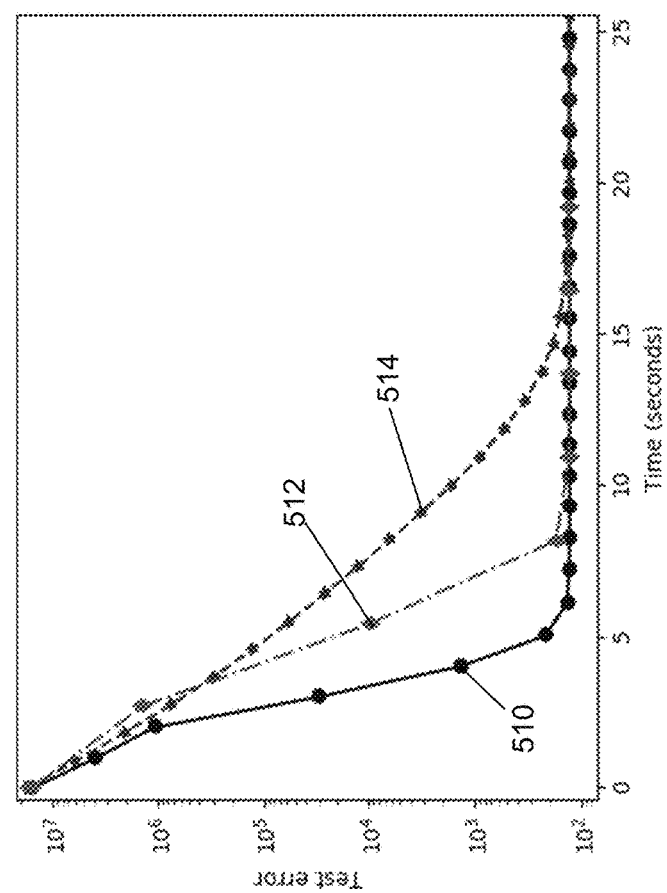
FIG. 5B shows a test error value comparison with the first data and the first input parameters in accordance with an illustrative embodiment.

Referring to FIG. 5A, a comparison of a training objective function as a function of time is shown for $$|F_2| = 18 \text{ and } \frac{|\Omega|}{mn} = 0.4$$

and $n_{feat} = |F_1| + |F_2| + |F_3| = 20$. A first curve 500 was generated using recommendation application 122; a second curve 502 was generated using ALS; and a third curve 504 was generated using softImpute-ALS. Referring to FIG. 5B, a comparison of a test error as a function of time is shown for $$|F_2| = 18 \text{ and } \frac{|\Omega|}{mn} = 0.4.$$

A fourth curve 510 was generated using recommendation application 122; a fifth curve 512 was generated using ALS; and a sixth curve 514 was generated using softImpute-ALS.

Figure 6B:
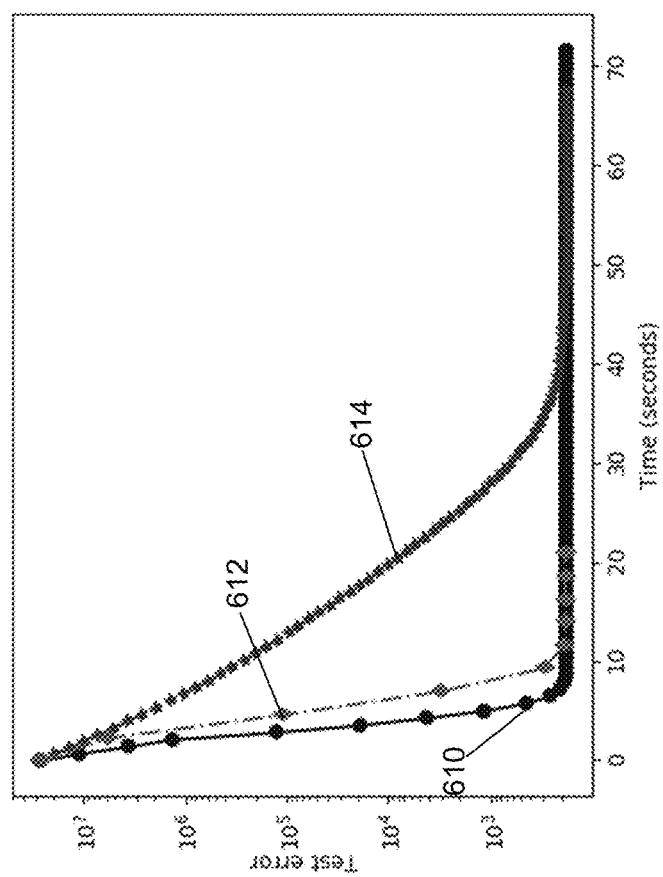
FIG. 6B shows a test error value comparison with the first data and the first input parameters in accordance with an illustrative embodiment.
Figure 6A:
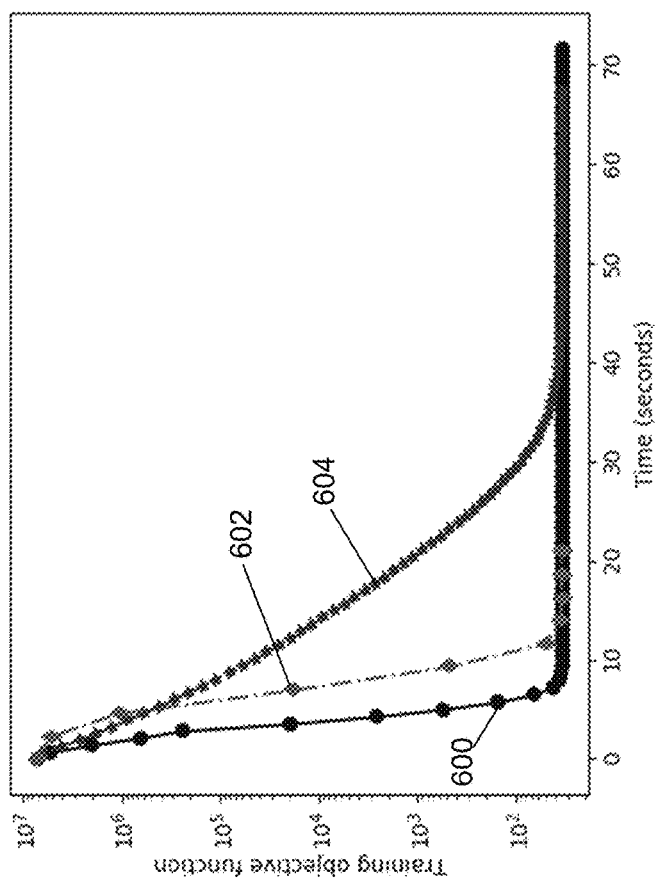
FIG. 6A shows a training objective function value comparison with the first data and third input parameters in accordance with an illustrative embodiment.

Referring to FIG. 6A, a comparison of a training objective function as a function of time is shown for $$|F_2| = 18 \text{ and } \frac{|\Omega|}{mn} = 0.2$$

and $n_{feat} = |F_1| + |F_2| + |F_3| = 20$. A first curve 600 was generated using recommendation application 122; a second curve 602 was generated using ALS; and a third curve 604 was generated using softImpute-ALS. Referring to FIG. 6B, a comparison of a test error as a function of time is shown for $$|F_2| = 18 \text{ and } \frac{|\Omega|}{mn} = 0.2.$$

A fourth curve 610 was generated using recommendation application 122; a fifth curve 612 was generated using ALS; and a sixth curve 614 was generated using softImpute-ALS.

Figure 7A:
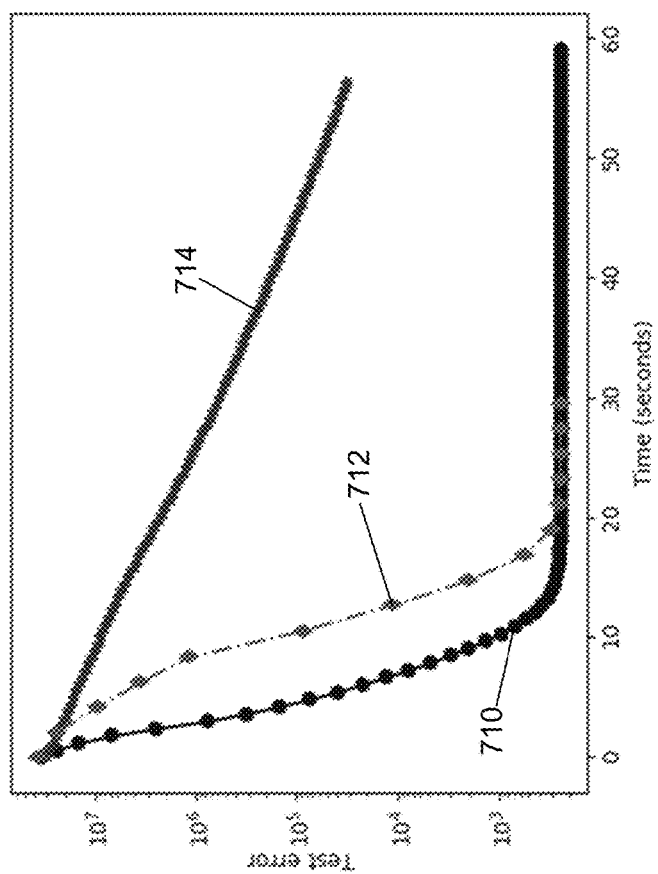
FIG. 7A shows a training objective function value comparison with the first data and fourth input parameters in accordance with an illustrative embodiment.
Figure 7B:
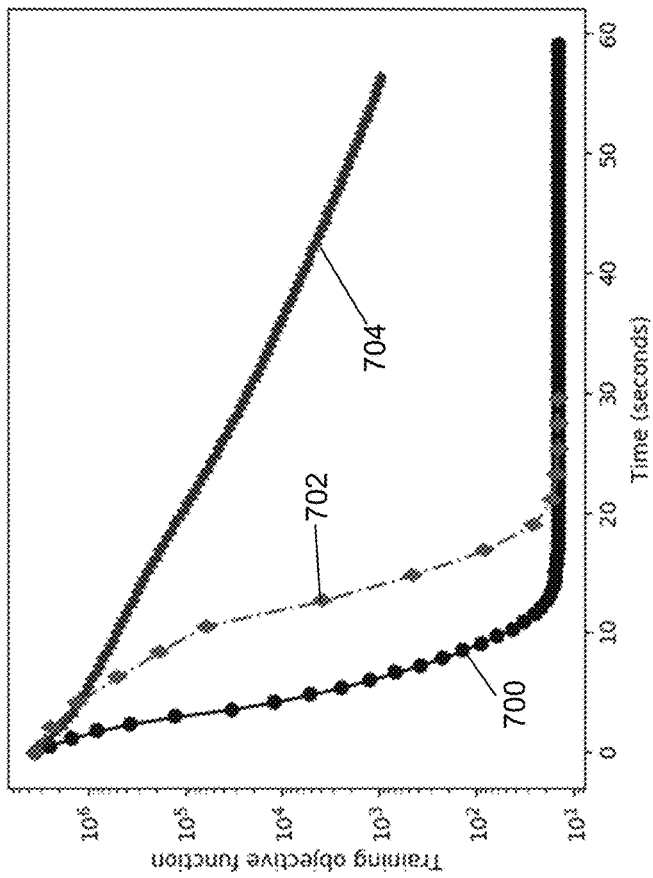
FIG. 7B shows a test error value comparison with the first data and the first input parameters in accordance with an illustrative embodiment.

Referring to FIG. 7A, a comparison of a training objective function as a function of time is shown for $$|F_2| = 18 \text{ and } \frac{|\Omega|}{mn} = 0.1$$

and $n_{feat}=|F_1|+|F_2|+|F_3|=20$. A first curve 700 was generated using recommendation application 122; a second curve 702 was generated using ALS; and a third curve 704 was generated using softImpute-ALS. Referring to FIG. 7B, a comparison of a test error as a function of time is shown for $$|F_2| = 18 \text{ and } \frac{|\Omega|}{mn} = 0.1.$$

A fourth curve 710 was generated using recommendation application 122; a fifth curve 712 was generated using ALS; and a sixth curve 714 was generated using softImpute-ALS.

Figure 8A:
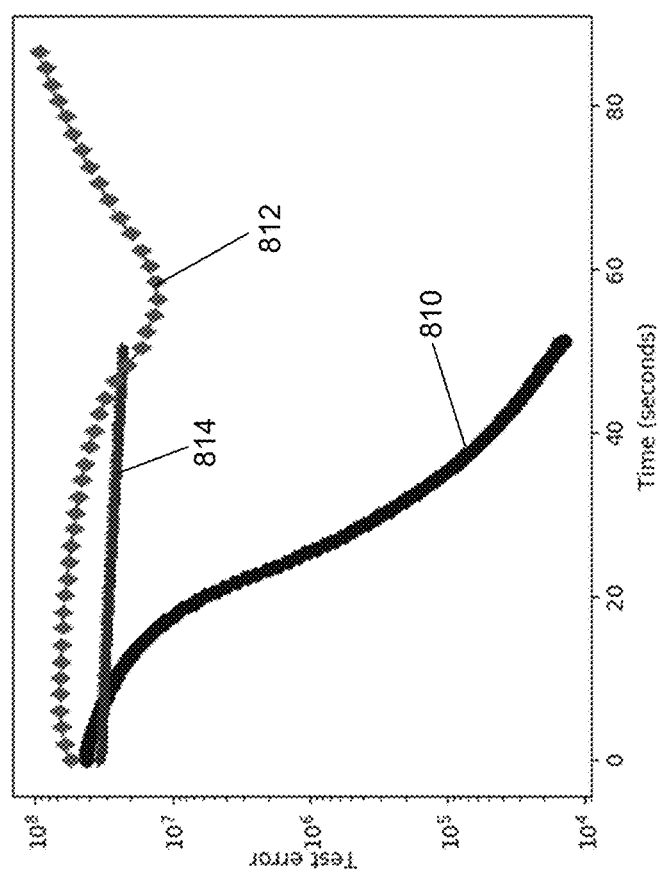
FIG. 8A shows a training objective function value comparison with the first data and fifth input parameters in accordance with an illustrative embodiment.
Figure 8B:
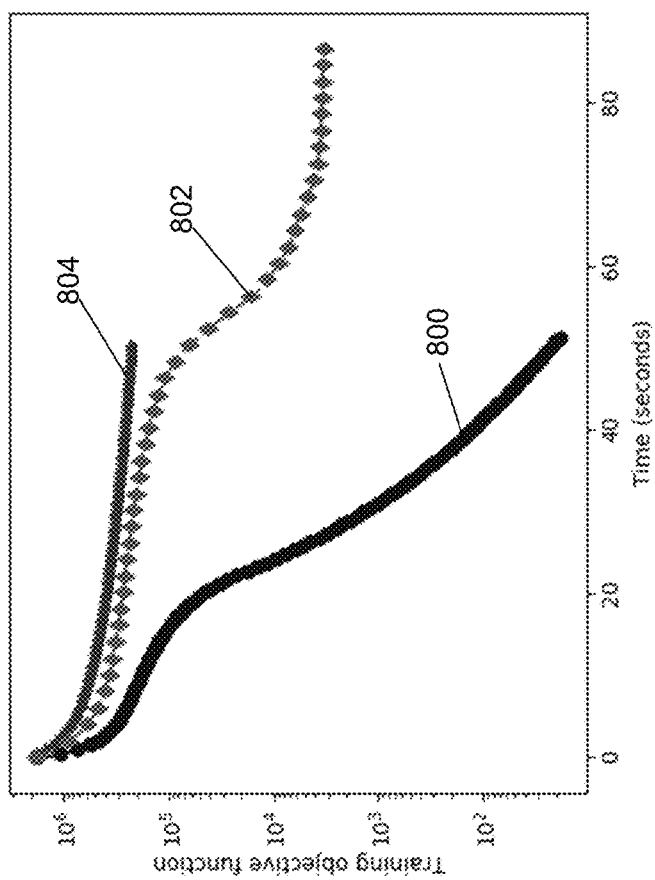
FIG. 8B shows a test error value comparison with the first data and the first input parameters in accordance with an illustrative embodiment.

Referring to FIG. 8A, a comparison of a training objective function as a function of time is shown for $$|F_2| = 18 \text{ and } \frac{|\Omega|}{mn} = 0.05$$

and $n_{feat}=|F_1|+|F_2|+|F_3|=20$. A first curve 800 was generated using recommendation application 122; a second curve 802 was generated using ALS; and a third curve 804 was generated using softImpute-ALS. Referring to FIG. 8B, a comparison of a test error as a function of time is shown for $$|F_2| = 18 \text{ and } \frac{|\Omega|}{mn} = 0.05.$$

A fourth curve 810 was generated using recommendation application 122; a fifth curve 812 was generated using ALS; and a sixth curve 814 was generated using softImpute-ALS.

Referring to FIG. 9A, a comparison of a training objective function as a function of time is shown for $$|F_2| = 18 \text{ and } \frac{|\Omega|}{mn} = 0.0125$$

and $n_{feat}=|F_1|+|F_2|+|F_3|=20$. A first curve 900 was generated using recommendation application 122; a second curve 902 was generated using ALS; and a third curve 904 was generated using softImpute-ALS. Referring to FIG. 9B, a comparison of a test error as a function of time is shown for $$|F_2| = 18 \text{ and } \frac{|\Omega|}{mn} = 0.0125.$$

A fourth curve 910 was generated using recommendation application 122; a fifth curve 912 was generated using ALS; and a sixth curve 914 was generated using softImpute-ALS.

Figure 10A:
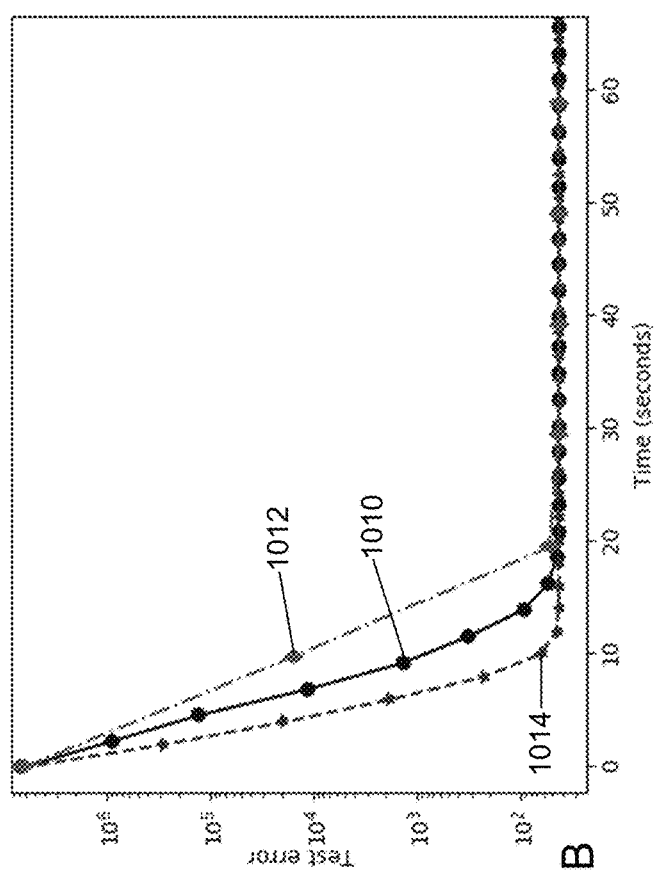
FIG. 10A shows a training objective function value comparison with the first data and seventh input parameters in accordance with an illustrative embodiment.
Figure 10B:
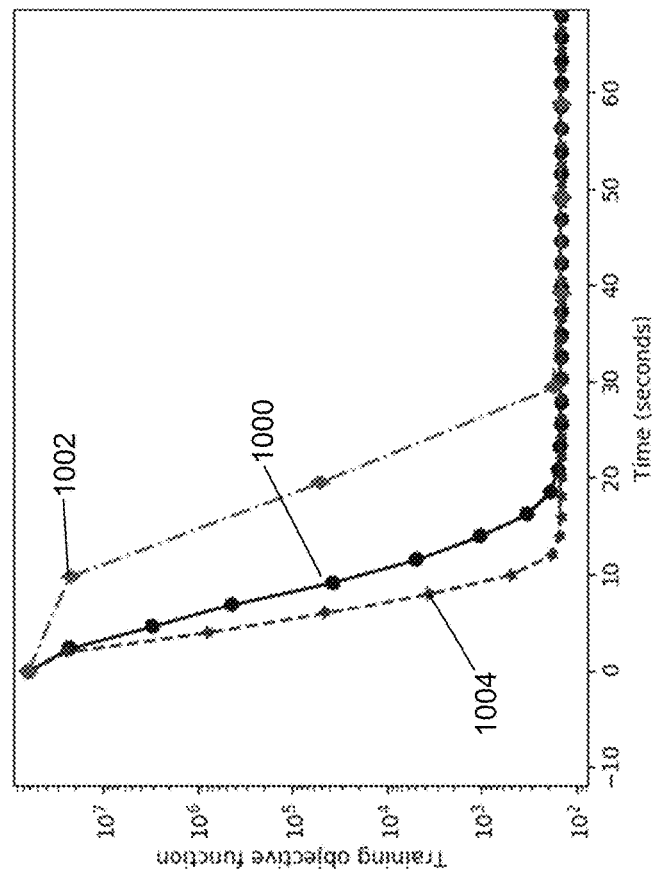
FIG. 10B shows a test error value comparison with the first data and the first input parameters in accordance with an illustrative embodiment.

Referring to FIG. 10A, a comparison of a training objective function as a function of time is shown for $$|F_2| = 38 \text{ and } \frac{|\Omega|}{mn} = 0.8$$

and $n_{feat}=|F_1|+|F_2|+|F_3|=40$. A first curve 1000 was generated using recommendation application 122; a second curve 1002 was generated using ALS; and a third curve 1004 was generated using softImpute-ALS. Referring to FIG. 10B, a comparison of a test error as a function of time is shown for $$|F_2| = 38 \text{ and } \frac{|\Omega|}{mn} = 0.8.$$

A fourth curve 1010 was generated using recommendation application 122; a fifth curve 1012 was generated using ALS; and a sixth curve 1014 was generated using softImpute-ALS.

Figure 11A:
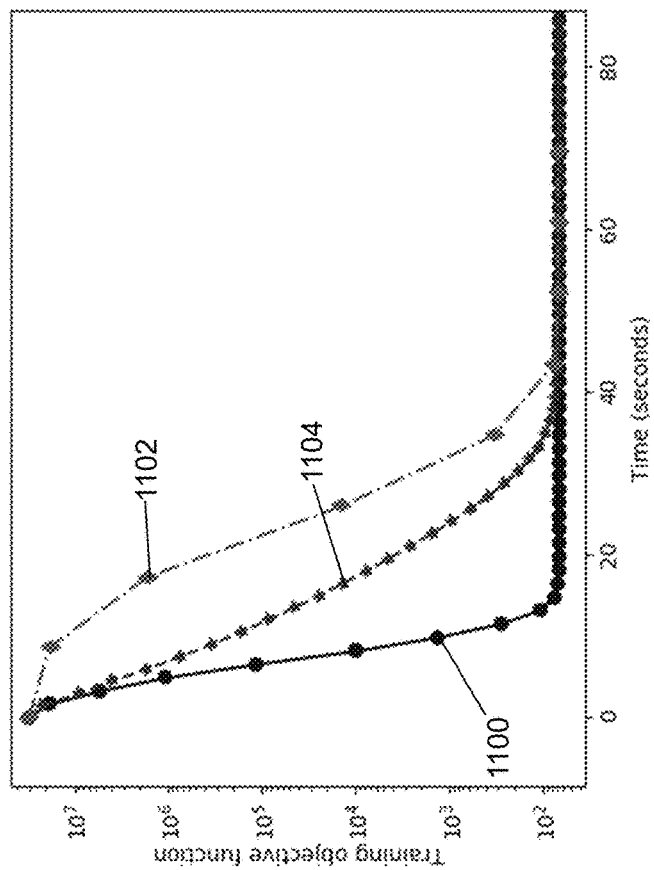
FIG. 11A shows a training objective function value comparison with the first data and eighth input parameters in accordance with an illustrative embodiment.
Figure 11B:
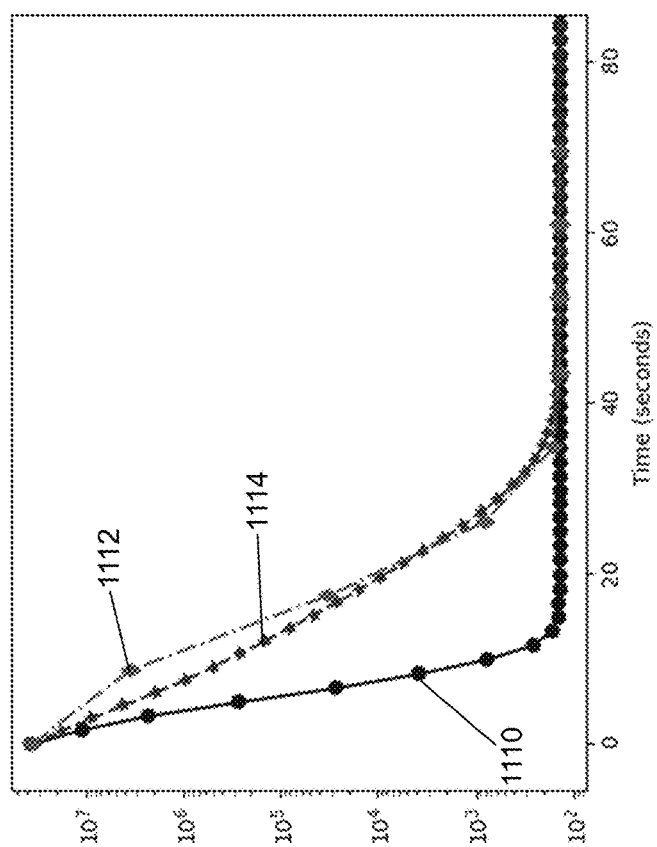
FIG. 11B shows a test error value comparison with the first data and the first input parameters in accordance with an illustrative embodiment.

Referring to FIG. 11A, a comparison of a training objective function as a function of time is shown for $$|F_2| = 38 \text{ and } \frac{|\Omega|}{mn} = 0.4$$

and $n_{feat}=|F_1|+|F_2|+|F_3|=40$. A first curve 1100 was generated using recommendation application 122; a second curve 1102 was generated using ALS; and a third curve 1104 was generated using softImpute-ALS. Referring to FIG. 11B, a comparison of a test error as a function of time is shown for $$|F_2| = 38 \text{ and } \frac{|\Omega|}{mn} = 0.4.$$

A fourth curve 1110 was generated using recommendation application 122; a fifth curve 1112 was generated using ALS; and a sixth curve 1114 was generated using softImpute-ALS.

Figure 12A:
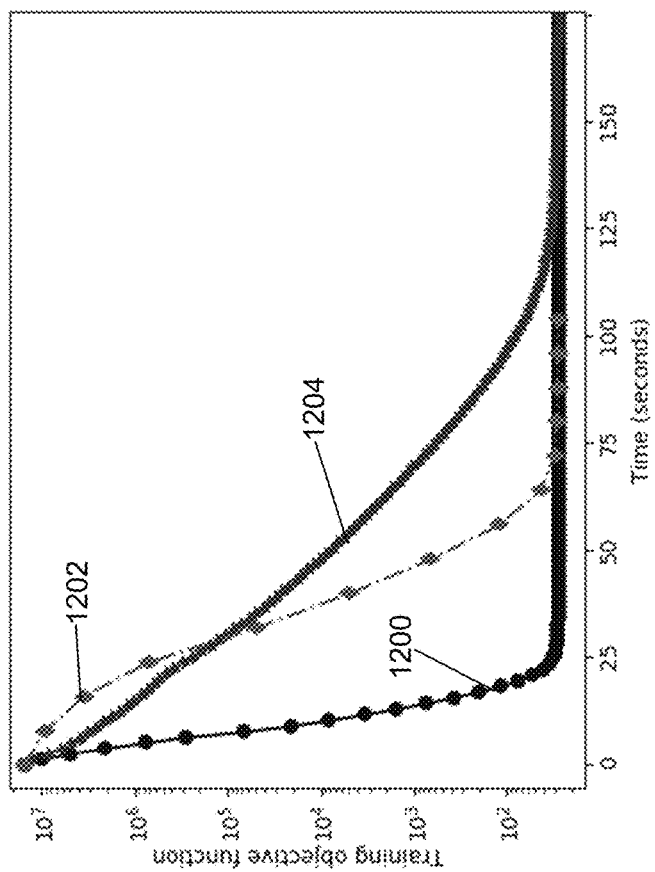
FIG. 12A shows a training objective function value comparison with the first data and ninth input parameters in accordance with an illustrative embodiment.
Figure 12B:
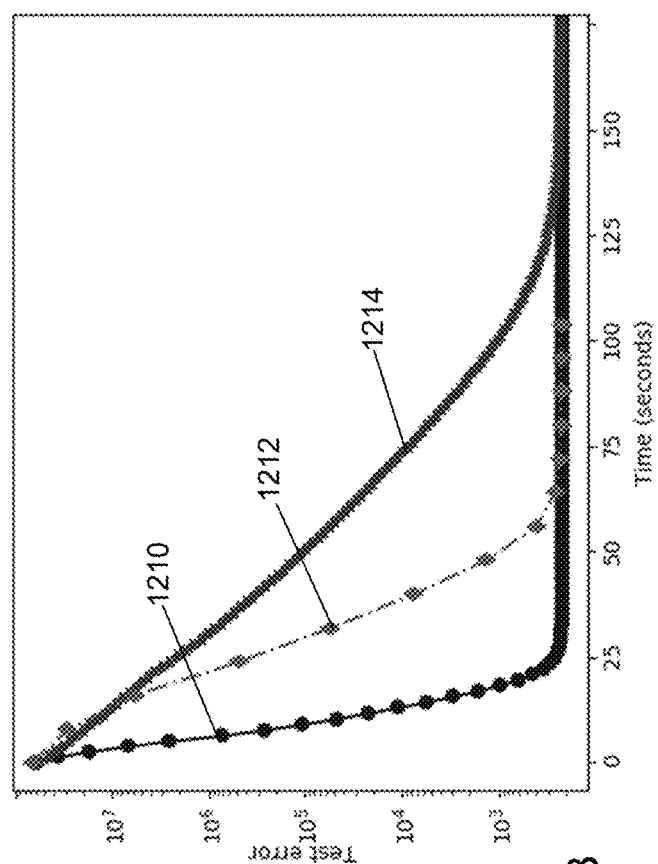
FIG. 12B shows a test error value comparison with the first data and the first input parameters in accordance with an illustrative embodiment.

Referring to FIG. 12A, a comparison of a training objective function as a function of time is shown for $$|F_2| = 38 \text{ and } \frac{|\Omega|}{mn} = 0.2$$

and $n_{feat}=|F_1|+|F_2|+|F_3|=40$. A first curve 1200 was generated using recommendation application 122; a second curve 1202 was generated using ALS; and a third curve 1204 was generated using softImpute-ALS. Referring to FIG. 12B, a comparison of a test error as a function of time is shown for $$|F_2| = 38 \text{ and } \frac{|\Omega|}{mn} = 0.2.$$

A fourth curve 1210 was generated using recommendation application 122; a fifth curve 1212 was generated using ALS; and a sixth curve 1214 was generated using softImpute-ALS.

Figure 13A:
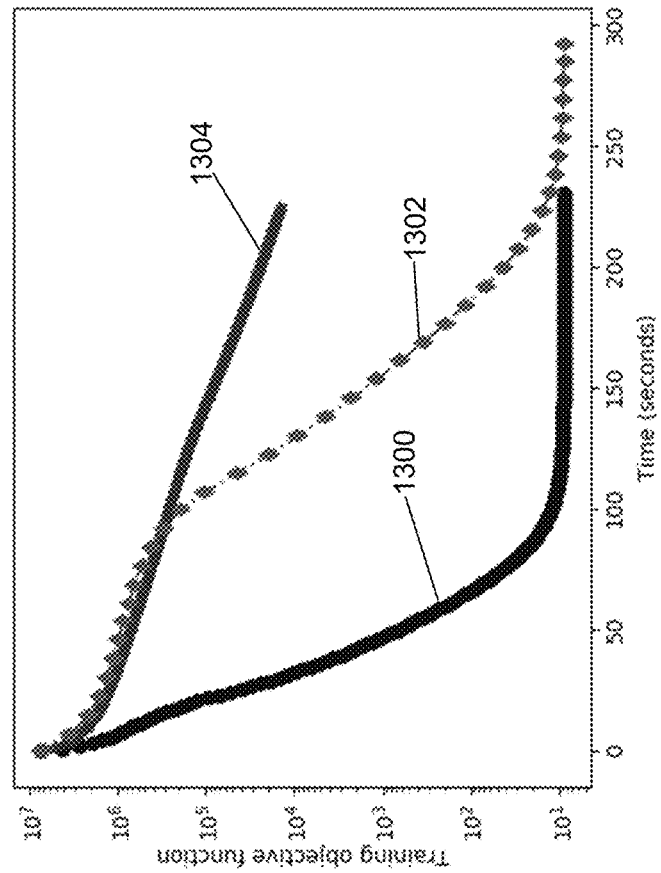
FIG. 13A shows a training objective function value comparison with the first data and tenth input parameters in accordance with an illustrative embodiment.
Figure 13B:
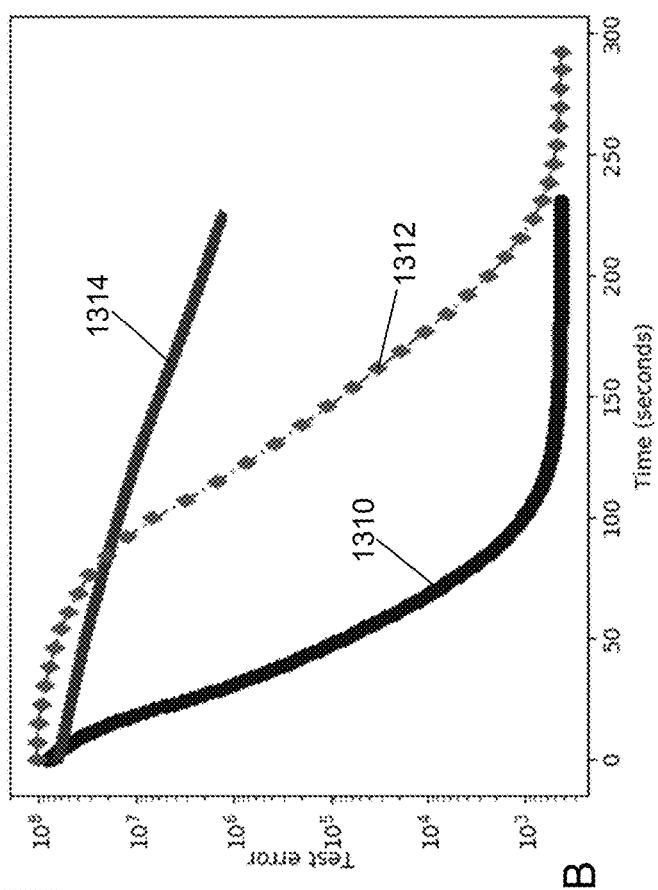
FIG. 13B shows a test error value comparison with the first data and the first input parameters in accordance with an illustrative embodiment.

Referring to FIG. 13A, a comparison of a training objective function as a function of time is shown for $$|F_2| = 38 \text{ and } \frac{|\Omega|}{mn} = 0.1$$

and $n_{feat}=|F_1|+|F_2|+|F_3|=40$. A first curve 1300 was generated using recommendation application 122; a second curve 1302 was generated using ALS; and a third curve 1304 was generated using softImpute-ALS. Referring to FIG. 13B, a comparison of a test error as a function of time is shown for $$|F_2| = 38 \text{ and } \frac{|\Omega|}{mn} = 0.1.$$

A fourth curve 1310 was generated using recommendation application 122; a fifth curve 1312 was generated using ALS; and a sixth curve 1314 was generated using softImpute-ALS.

Figure 14B:
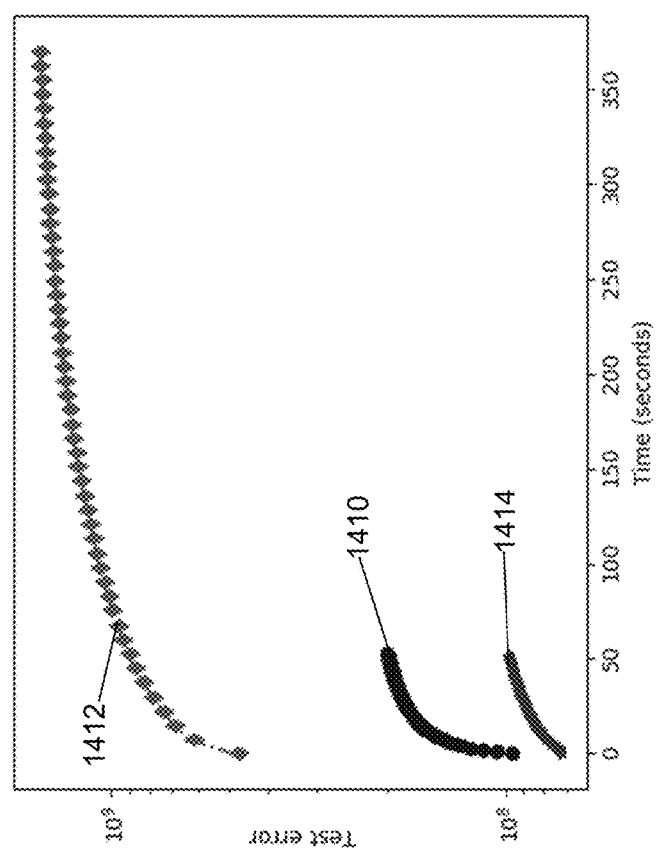
FIG. 14B shows a test error value comparison with the first data and the first input parameters in accordance with an illustrative embodiment.
Figure 14A:
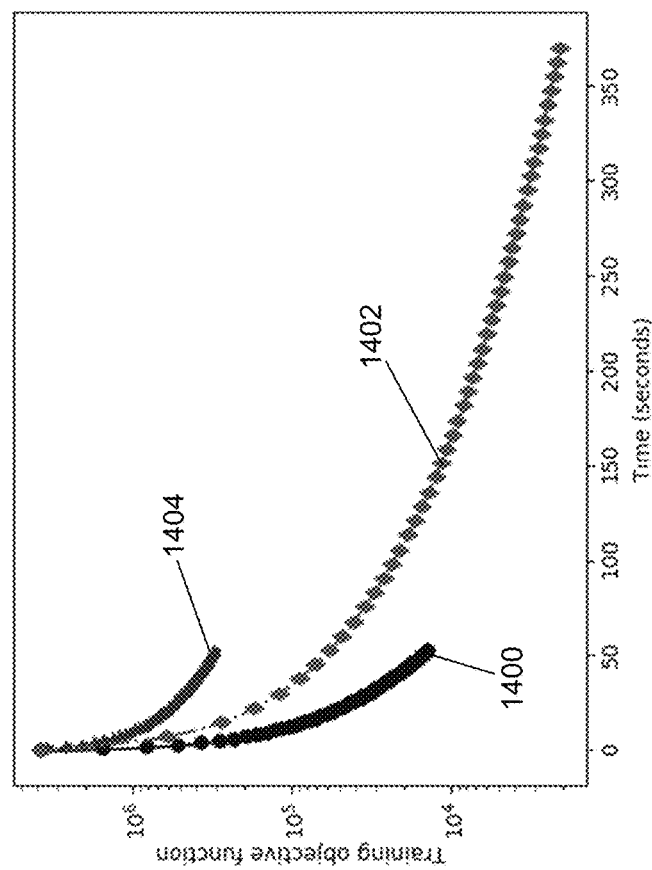
FIG. 14A shows a training objective function value comparison with the first data and eleventh input parameters in accordance with an illustrative embodiment.

Referring to FIG. 14A, a comparison of a training objective function as a function of time is shown for $$|F_2| = 38 \text{ and } \frac{|\Omega|}{mn} = 0.05$$

and $n_{feat}=|F_1|+|F_2|+|F_3|=40$. A first curve 1400 was generated using recommendation application 122; a second curve 1402 was generated using ALS; and a third curve 1404 was generated using softImpute-ALS. Referring to FIG. 14B, a comparison of a test error as a function of time is shown for $$|F_2| = 38 \text{ and } \frac{|\Omega|}{mn} = 0.05.$$

A fourth curve 1410 was generated using recommendation application 122; a fifth curve 1412 was generated using ALS; and a sixth curve 1414 was generated using softImpute-ALS.

Figure 15A:
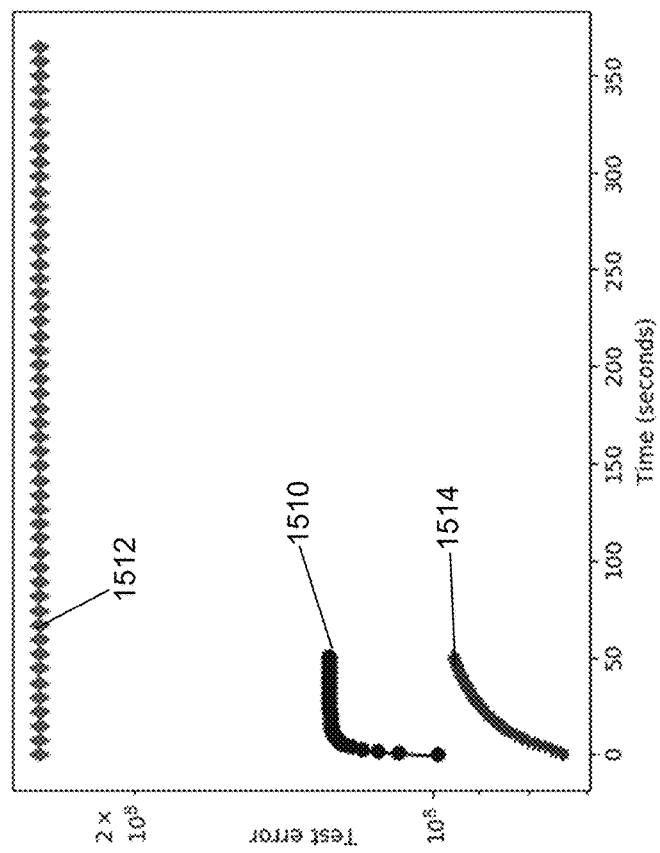
FIG. 15A shows a training objective function value comparison with the first data and twelfth input parameters in accordance with an illustrative embodiment.
Figure 15B:
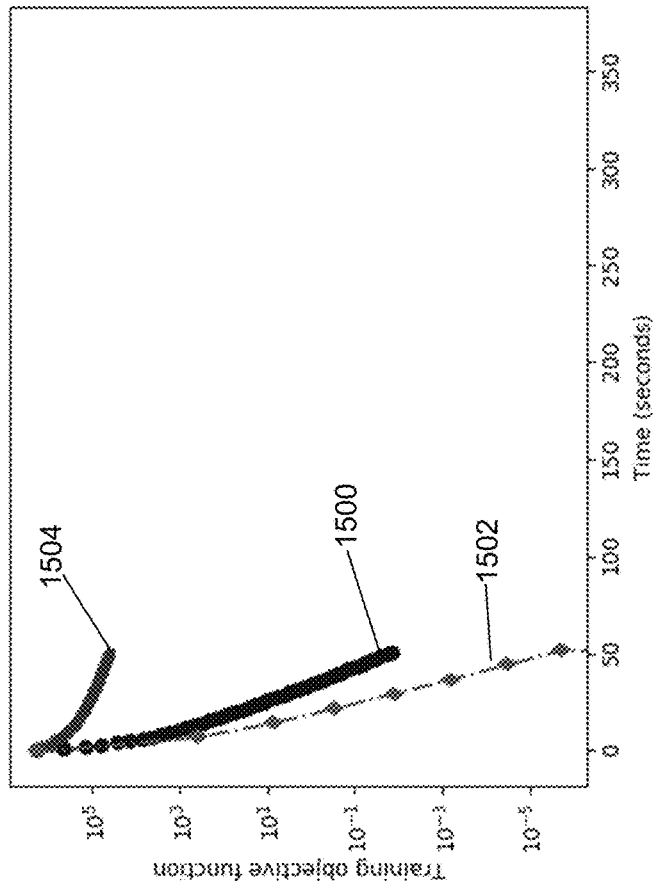
FIG. 15B shows a test error value comparison with the first data and the first input parameters in accordance with an illustrative embodiment.

Referring to FIG. 15A, a comparison of a training objective function as a function of time is shown for $$|F_2| = 38 \text{ and } \frac{|\Omega|}{mn} = 0.025$$

and $n_{feat}=|F_1|+|F_2|+|F_3|=40$. A first curve 1500 was generated using recommendation application 122; a second curve 1502 was generated using ALS; and a third curve 1504 was generated using softImpute-ALS. Referring to FIG. 15B, a comparison of a test error as a function of time is shown for $$|F_2| = 38 \text{ and } \frac{|\Omega|}{mn} = 0.025.$$

A fourth curve 1510 was generated using recommendation application 122; a fifth curve 1512 was generated using ALS; and a sixth curve 1514 was generated using softImpute-ALS.

Figure 16A:
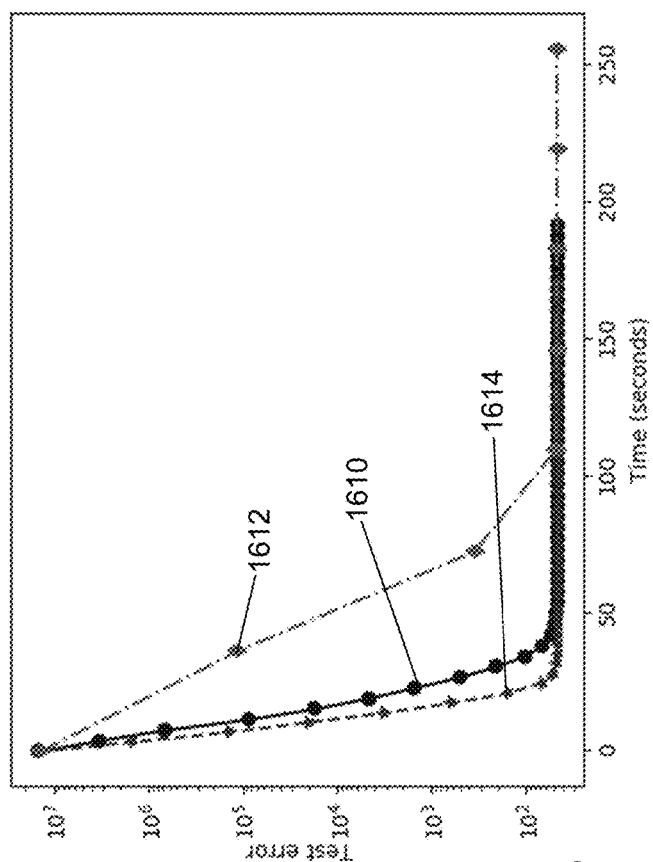
FIG. 16A shows a training objective function value comparison with the first data and thirteenth input parameters in accordance with an illustrative embodiment.
Figure 16B:
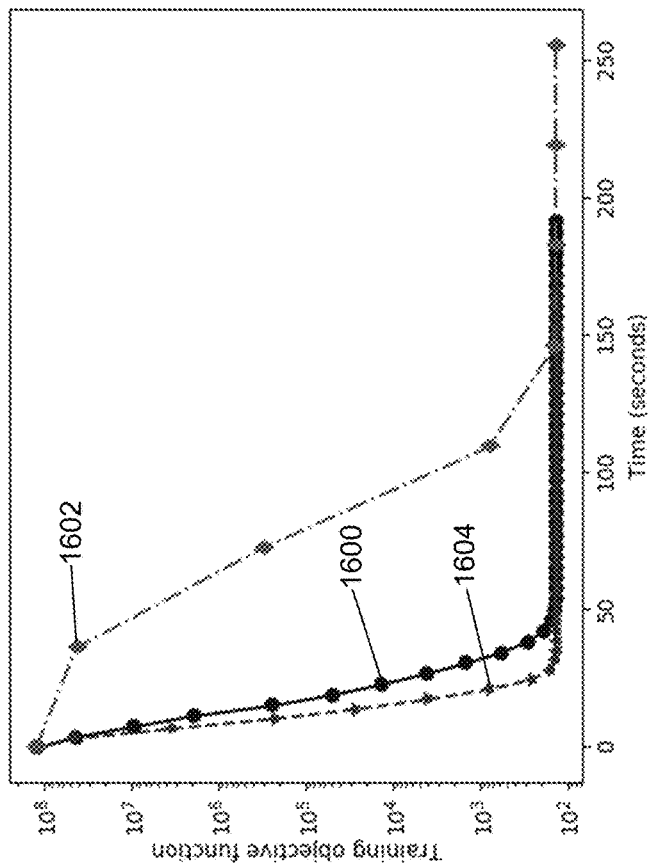
FIG. 16B shows a test error value comparison with the first data and the first input parameters in accordance with an illustrative embodiment.

Referring to FIG. 16A, a comparison of a training objective function as a function of time is shown for $$|F_2| = 78 \text{ and } \frac{|\Omega|}{mn} = 0.8$$

and $n_{feat}=|F_1|+|F_2|+|F_3|=80$. A first curve 1600 was generated using recommendation application 122; a second curve 1602 was generated using ALS; and a third curve 1604 was generated using softImpute-ALS. Referring to FIG. 16B, a comparison of a test error as a function of time is shown for $$|F_2| = 78 \text{ and } \frac{|\Omega|}{mn} = 0.8.$$

A fourth curve 1610 was generated using recommendation application 122; a fifth curve 1612 was generated using ALS; and a sixth curve 1614 was generated using softImpute-ALS.

Referring to FIG. 17A, a comparison of a training objective function as a function of time is shown for $$|F_2| = 78 \text{ and } \frac{|\Omega|}{mn} = 0.4$$

and $n_{feat}=|F_1|+|F_2|+|F_3|=80$. A first curve 1700 was generated using recommendation application 122; a second curve 1702 was generated using ALS; and a third curve 1704 was generated using softImpute-ALS. Referring to FIG. 17B, a comparison of a test error as a function of time is shown for $$|F_2| = 78 \text{ and } \frac{|\Omega|}{mn} = 0.4.$$

A fourth curve 1710 was generated using recommendation application 122; a fifth curve 1712 was generated using ALS; and a sixth curve 1714 was generated using softImpute-ALS.

Figure 18A:
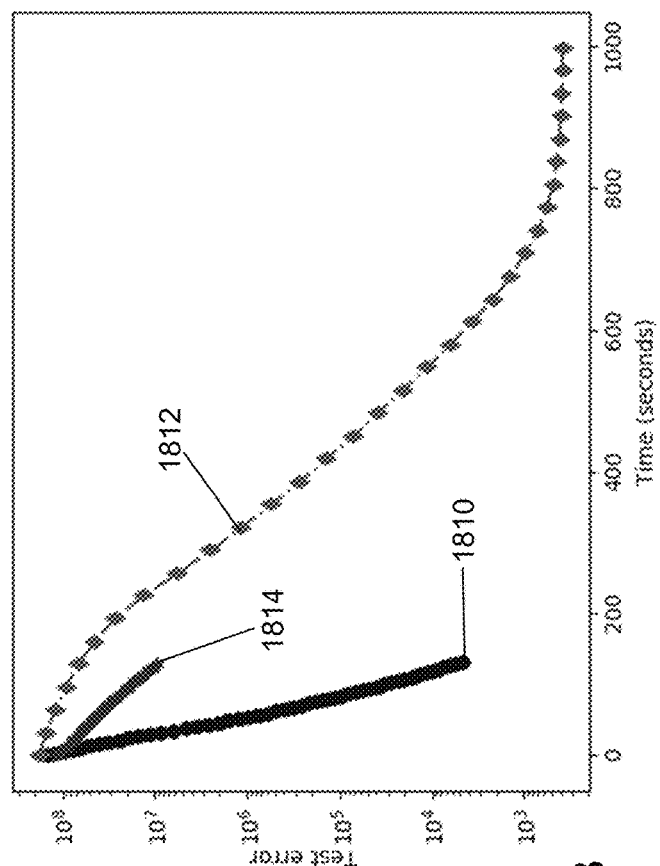
FIG. 18A shows a training objective function value comparison with the first data and fifteenth input parameters in accordance with an illustrative embodiment.
Figure 18B:
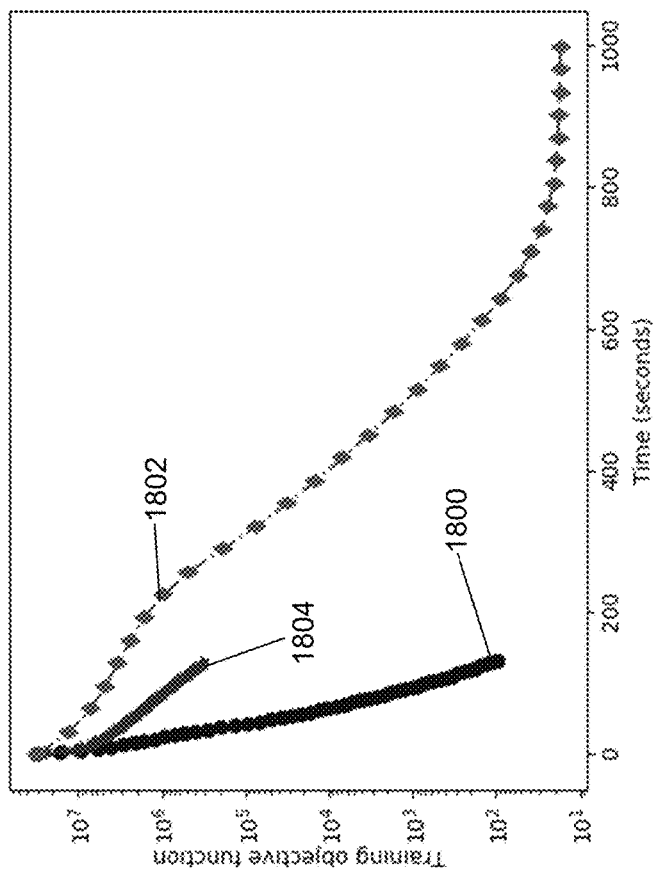
FIG. 18B shows a test error value comparison with the first data and the first input parameters in accordance with an illustrative embodiment.

Referring to FIG. 18A, a comparison of a training objective function as a function of time is shown for $$|F_2| = 78 \text{ and } \frac{|\Omega|}{mn} = 0.2$$

and $n_{feat}=|F_1|+|F_2|+|F_3|=80$. A first curve 1800 was generated using recommendation application 122; a second curve 1802 was generated using ALS; and a third curve 1804 was generated using softImpute-ALS. Referring to FIG. 18B, a comparison of a test error as a function of time is shown for $$|F_2| = 78 \text{ and } \frac{|\Omega|}{mn} = 0.2.$$

A fourth curve 1810 was generated using recommendation application 122; a fifth curve 1812 was generated using ALS; and a sixth curve 1814 was generated using softImpute-ALS.

Figure 19B:
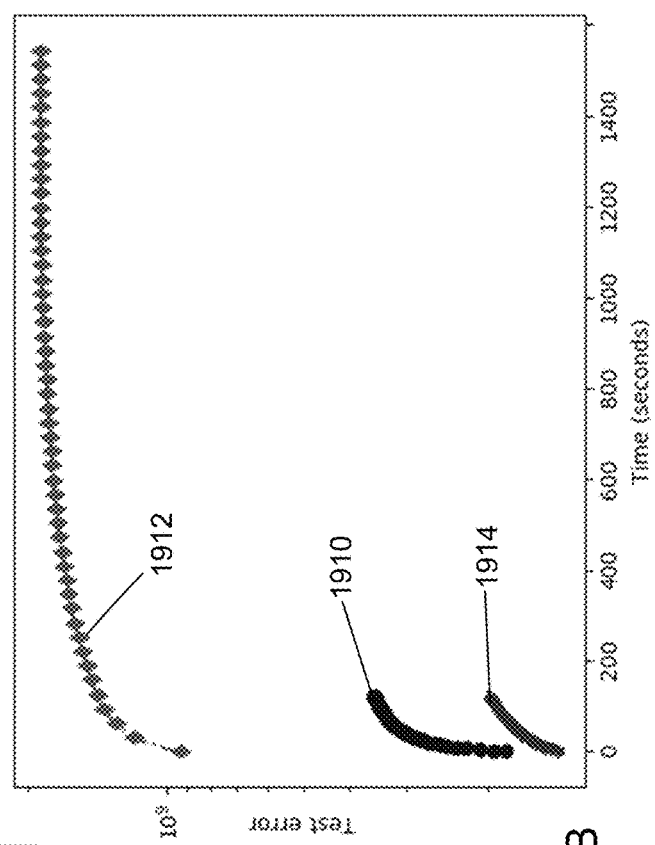
FIG. 19B shows a test error value comparison with the first data and the first input parameters in accordance with an illustrative embodiment.
Figure 19A:
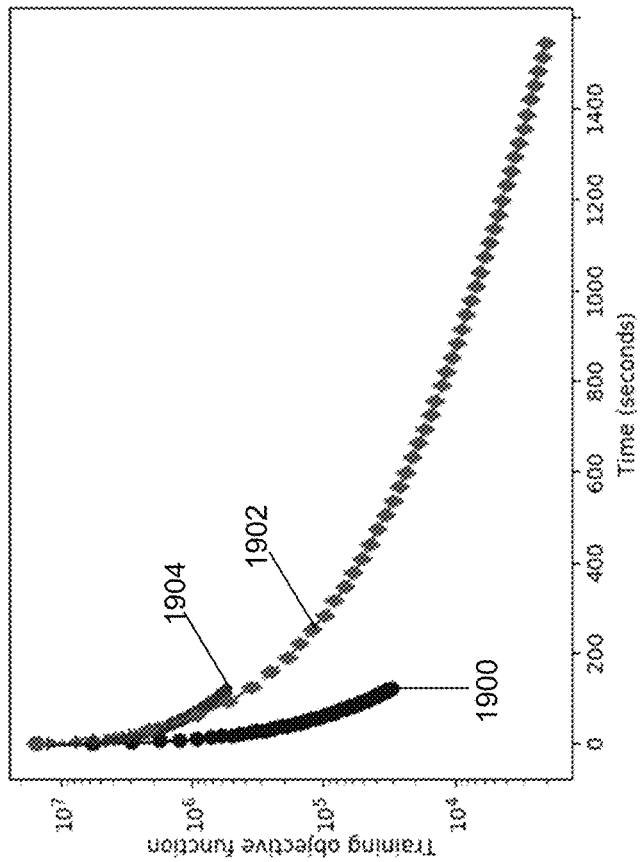
FIG. 19A shows a training objective function value comparison with the first data and sixteenth input parameters in accordance with an illustrative embodiment.

Referring to FIG. 19A, a comparison of a training objective function as a function of time is shown for $$|F_2| = 78 \text{ and } \frac{|\Omega|}{mn} = 0.1$$

and $n_{feat}=|F_1|+|F_2|+|F_3|=80$. A first curve 1900 was generated using recommendation application 122; a second curve 1902 was generated using ALS; and a third curve 1904 was generated using softImpute-ALS. Referring to FIG. 19B, a comparison of a test error as a function of time is shown for $$|F_2| = 78 \text{ and } \frac{|\Omega|}{mn} = 0.1.$$

A fourth curve 1910 was generated using recommendation application 122; a fifth curve 1912 was generated using ALS; and a sixth curve 1914 was generated using softImpute-ALS.

Figure 20A:
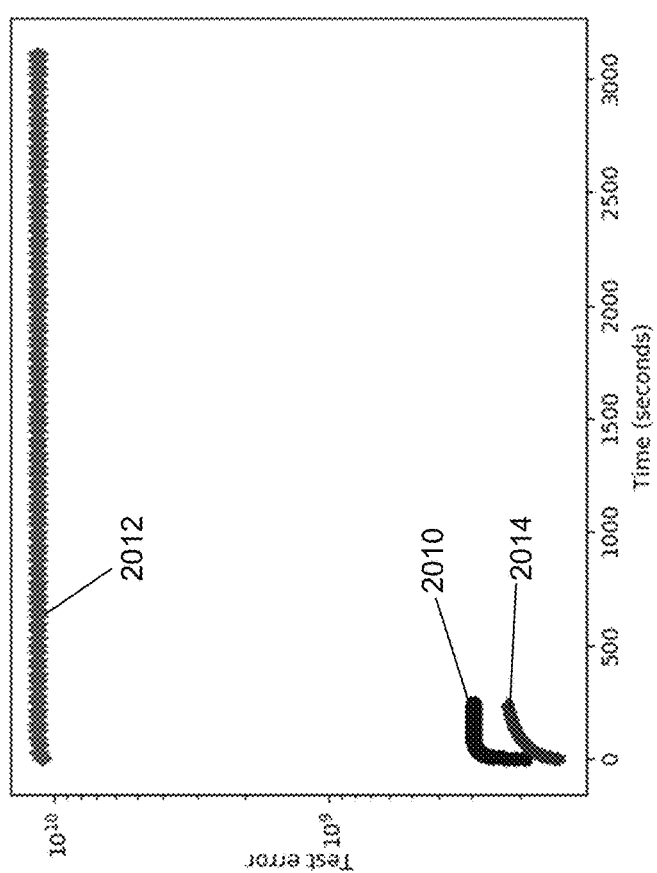
FIG. 20A shows a training objective function value comparison with the first data and seventeenth input parameters in accordance with an illustrative embodiment.
Figure 20B:
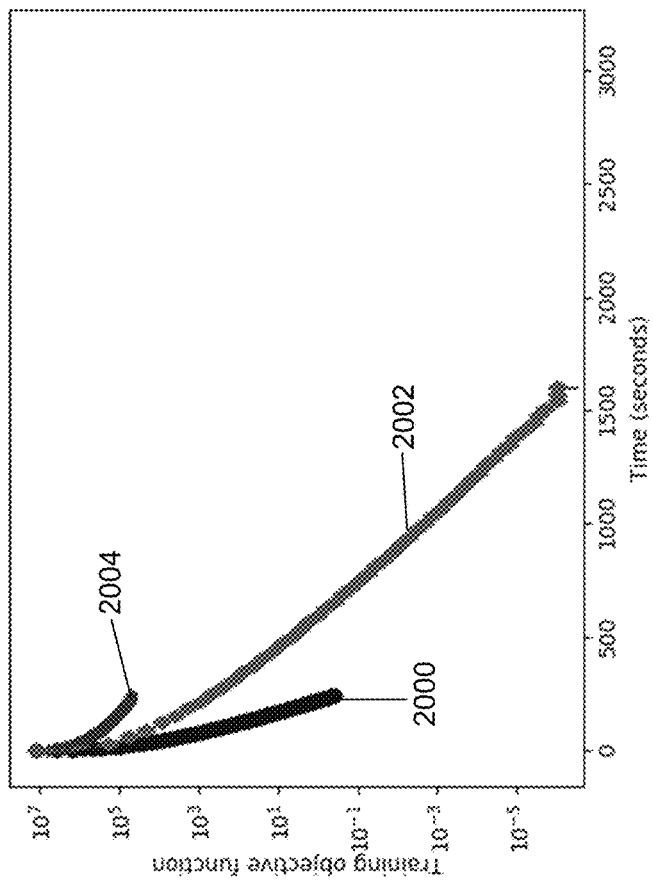
FIG. 20B shows a test error value comparison with the first data and the first input parameters in accordance with an illustrative embodiment.

Referring to FIG. 20A, a comparison of a training objective function as a function of time is shown for $$|F_2| = 78 \text{ and } \frac{|\Omega|}{mn} = 0.075$$

and $n_{feat}=|F_1|+|F_2|+|F_3|=80$. A first curve 2000 was generated using recommendation application 122; a second curve 2002 was generated using ALS; and a third curve 2004 was generated using softImpute-ALS. Referring to FIG. 20B, a comparison of a test error as a function of time is shown for $$|F_2| = 78 \text{ and } \frac{|\Omega|}{mn} = 0.075.$$

A fourth curve 2010 was generated using recommendation application 122; a fifth curve 2012 was generated using ALS; and a sixth curve 2014 was generated using softImpute-ALS.

Figure 21B:
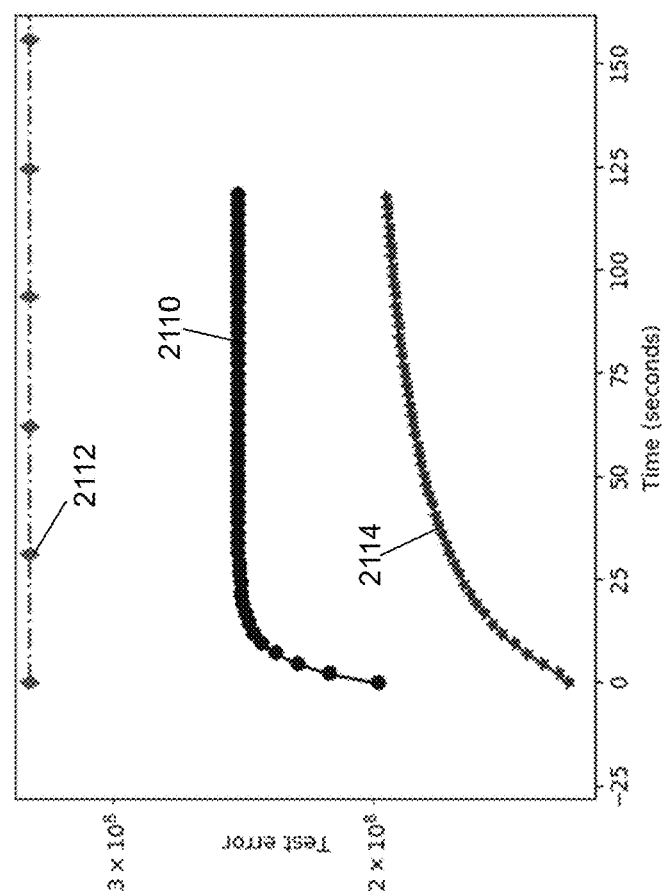
FIG. 21B shows a test error value comparison with the first data and the first input parameters in accordance with an illustrative embodiment.
Figure 21A:
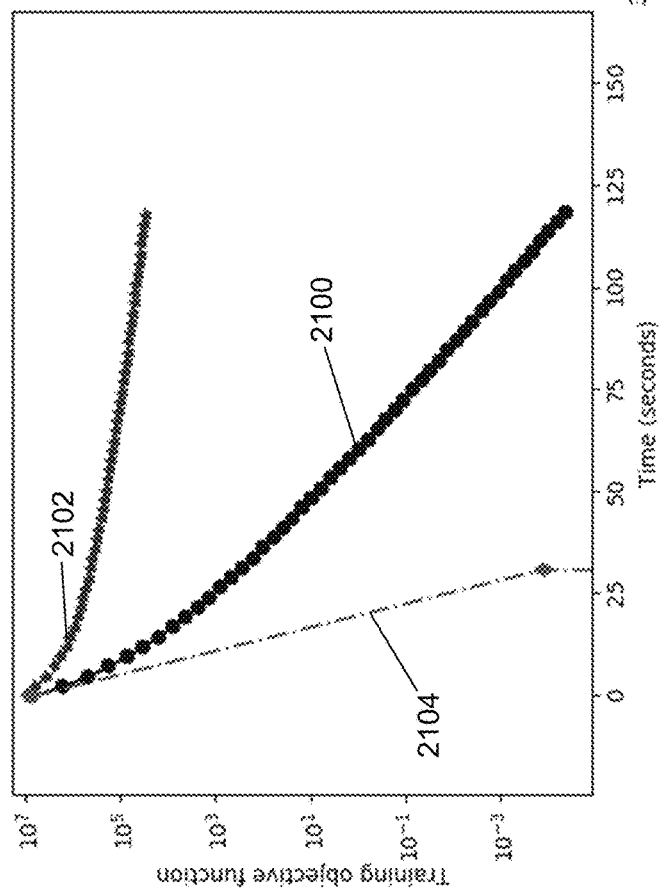
FIG. 21A shows a training objective function value comparison with the first data and eighteenth input parameters in accordance with an illustrative embodiment.

Referring to FIG. 21A, a comparison of a training objective function as a function of time is shown for $$|F_2| = 78 \text{ and } \frac{|\Omega|}{mn} = 0.05$$

and $n_{feat}=|F_1|+|F_2|+|F_3|=80$. A first curve 2100 was generated using recommendation application 122; a second curve 2102 was generated using ALS; and a third curve 2104 was generated using softImpute-ALS. Referring to FIG. 21B, a comparison of a test error as a function of time is shown for $$|F_2| = 78 \text{ and } \frac{|\Omega|}{mn} = 0.05.$$

A fourth curve 2110 was generated using recommendation application 122; a fifth curve 2112 was generated using ALS; and a sixth curve 2114 was generated using softImpute-ALS.

In the progression from FIGS. 4A through 9A, from FIGS. 10A through 15A, and from FIGS. 16A through 21A, for each specific value of $|F_2|$, the value of $|\Omega|$ decreases, meaning there is less and less training data to learn the ratings matrix. In the progression from FIGS. 4A to 10A to 16A, from FIGS. 5A to 11A to 17A, FIGS. 6A to 12A to 18A, FIGS. 7A to 13A to 19A, FIGS. 8A to 14A to 20A, and from FIGS. 9A to 15A to 21A, for each specific value of $|\Omega|$, the value of $|F_2|$ increases meaning there is a successively more complex rating matrix. Thus, FIG. 21A is the most difficult case to learn having the least training data and the most complex ratings matrix.

Based on a review of the results, ALS makes the most aggressive progress between iterations followed by recommendation application 122 and then by softImpute-ALS. The difference between the algorithms decreases with MI, demonstrating that a highly observed R is not an interesting case. In terms of learning speed, softImpute-ALS learns the easy problems the fastest and ALS learns the hardest problems the fastest. However, a fast learner does not necessarily generalize well.

To obtain a more in-depth understanding, the results were classified into three cases according to the sufficiency of the training data. For a first case, the training data was overly sufficient as represented by FIGS. 4A, 10A, and 16A, in which 80% of the entries in R are used as training data. With this high percentage of observability, R is close to a complete matrix and all three algorithms achieve an excellent training objective function value and generalize well based on an excellent test error. As expected, recommendation application 122 and softImpute-ALS achieve the excellent results in a similar amount of time that is much faster than ALS. In this case, the better an algorithm converged in learning, the better it performed in generalization, demonstrating that over-fitting is unlikely to happen when training data are sufficient. However, overly-sufficient training data is wasteful due to the effort required to collect the unnecessary extra data. As a result, this case does not typically occur in practice.

For a second case, the training data was very insufficient as represented by FIGS. 9A, 15A, and 21A, in which 1.25% of the entries in R were used as training data for $|F_2|=18$, 2.5% for $|F_2|=38$, and 5% for $|F_2|=78$. The different training percentages reflect the fact that a larger $|F_2|$ indicates a more complex R matrix, which requires more training data to learn a meaningful model. In the second case, R was missing most entries and hence deviated significantly from a complete matrix resulting in only a few ratings to train on. More specifically, the number of training ratings per user and/or item could be smaller than $|F_2|$, which makes each algorithm close to an underdetermined problem. $\lambda=0.01$ may not provide enough regularization using recommendation application 122 and softImpute-ALS. The objective function value computed using ALS decreased to below $10^{-3}$ in just one or a few iterations, confirming that the underdetermined problem occurred in these experiments.

An underdetermined problem requires additional information to compensate for the insufficient training data. Such additional information could be encoded by regularizers, constraints, or priors in a Bayesian setting. Unless the additional information is incorporated, the solution overfits the training data and cannot generalize well to new data. What is worse in this case is that the more an algorithm converged in learning, the poorer it performed in generalization. Although ALS converges faster than softImpute-ASL and recommendation application 122 in this case, it performed worse in generalization, because softImpute-ASL and recommendation application 122 do not follow the training data as closely as ALS during the learning process.

For a third case, the amount of training data was reasonable. This case is shown in the remaining figures and is a more typical case covering a wide range of scenarios, with the training percentage ranging from 5% to 40% for $|F_2|=18$ and $|F_2|=38$, and from 7.5% to 40% for $|F_2|=78$. In this more typical case, recommendation application 122 converged the fastest in learning and spent the least time reaching a model that generalized well when 1.0.1 was large enough to avoid over-fitting. When 1.0.1 was too small and over-fitting was inevitable, recommendation application 122 behaved more similar to softImpute-ALS than to ALS in terms of generalization as measured by the test error. The advantage of recommendation application 122 over softImpute-ALS becomes more pronounced as $|\Omega|$ decreased because recommendation application 122 achieved an additional improvement each iteration by the amount $(\eta_1-1)\Sigma_{(u,i)\in\bar{\Omega}}(D_{u:}Y_{P_i})^2$ and $(\eta_2-1)\Sigma_{(u,i)\in\bar{\Omega}}(X_{u\Omega}Z_{:i})^2$. As $|\Omega|$ decreased, $|\bar{\Omega}|=mn-|\Omega|$ increased, which can lead to a significant increase in the additional improvement that results from use of recommendation application 122 with $\eta_1\geq 1$ and $\eta_2\geq 1$.

The second dataset was selected from the MovieLens 1M Dataset, which is a public-domain dataset. The second dataset included 1,000,209 ratings of n=3706 movies from m=6040 users resulting in R being 6040×3706 matrix.

Unlike the synthetic data, there was no access to the full R matrix. Because of this, the available ratings were split in half, with one half used as training data and the other half as test data. Accordingly, $$|\Omega| = \frac{1,000,209}{2} = 500,104$$

and $|\Omega|/(mn) \approx 2.234$. The available ratings constitute only about 4.468% of the full entries of R. The low percentage makes the problem fall into the second case discussed with reference to the synthetic data. Thus, adjusting $|\Omega|$ makes little change in this regard. Because of this, $\lambda$ was adjusted to see the effects of the L2 regularizer in helping to improve generalization. Since this is a real dataset, the true rank of R is not known. Therefore, $|F_2|$ was adjusted to examine how it affected the results. Moreover, the full MF-PDF model was used for recommendation application 122 with user and item biases, i.e., $|F_1|=|F_2|=1$. In summary, the goal of this experiment was to examine the learning convergence and generalization performance of the three algorithms using different settings for $|F_2|$ and $\lambda$. For a given setting of ($|F_2|$, $\lambda$), each learning algorithm was run on the training data. The model produced at each iteration was evaluated using the normalized squared error, $\Sigma_{(u,i)}(R_{ui}-X_{uF_2}Y_{F_2}i)^2/\Sigma_{(u,i)}(R_{ui})^2$, on both the test data and the training data, where the sum is taken over the training set and test set, respectively. The normalizers are constant, and do not change the shape of the resulting curves.

Figure 22A:
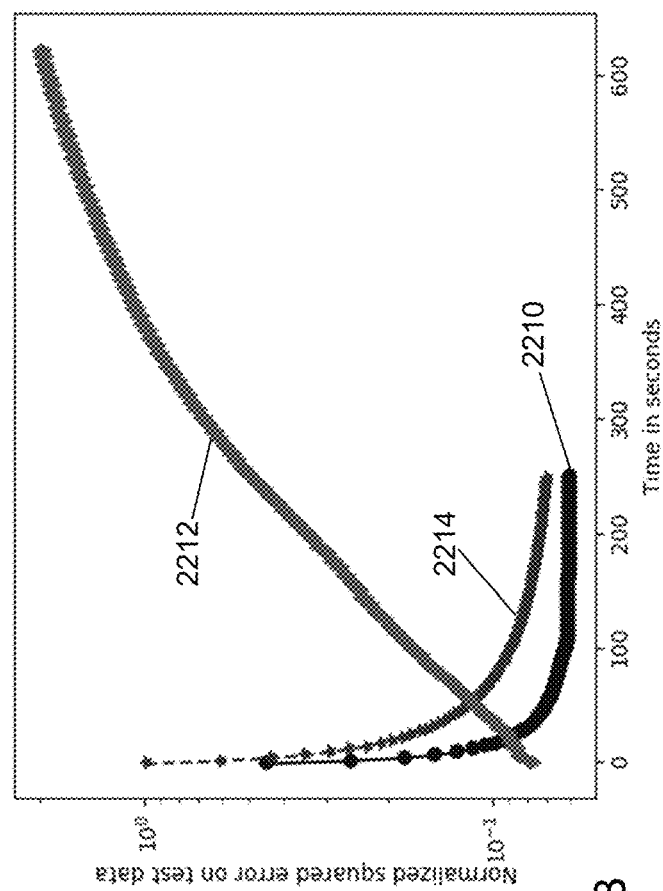
FIG. 22A shows a training objective function value comparison with second data and nineteenth input parameters in accordance with an illustrative embodiment.
Figure 22B:
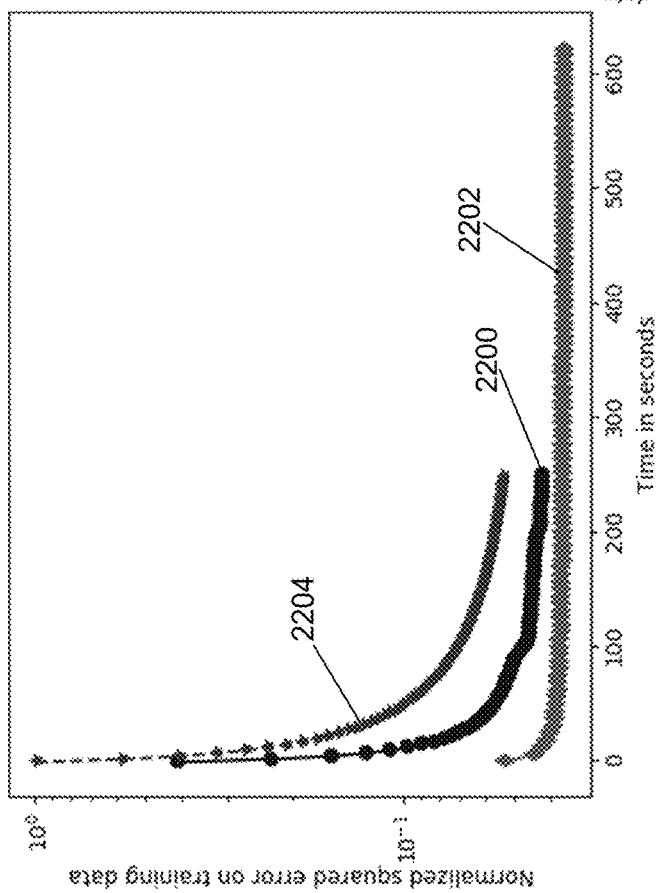
FIG. 22B shows a test error value comparison with the second data and the first input parameters in accordance with an illustrative embodiment.

Referring to FIG. 22A, a comparison of a normalized square error using the training data as a function of time is shown for the second dataset with $|F_2|=8$ and $\lambda=0.01$ and $n_{feat}=|F_1|+|F_2|+|F_3|=10$. A first curve 2200 was generated using recommendation application 122; a second curve 2202 was generated using ALS; and a third curve 2204 was generated using softImpute-ALS. Referring to FIG. 22B, a comparison of a normalized square error using the test data as a function of time is shown for $|F_2|=8$ and $\lambda=0.01$. A fourth curve 2210 was generated using recommendation application 122; a fifth curve 2212 was generated using ALS; and a sixth curve 2214 was generated using softImpute-ALS.

Figure 23B:
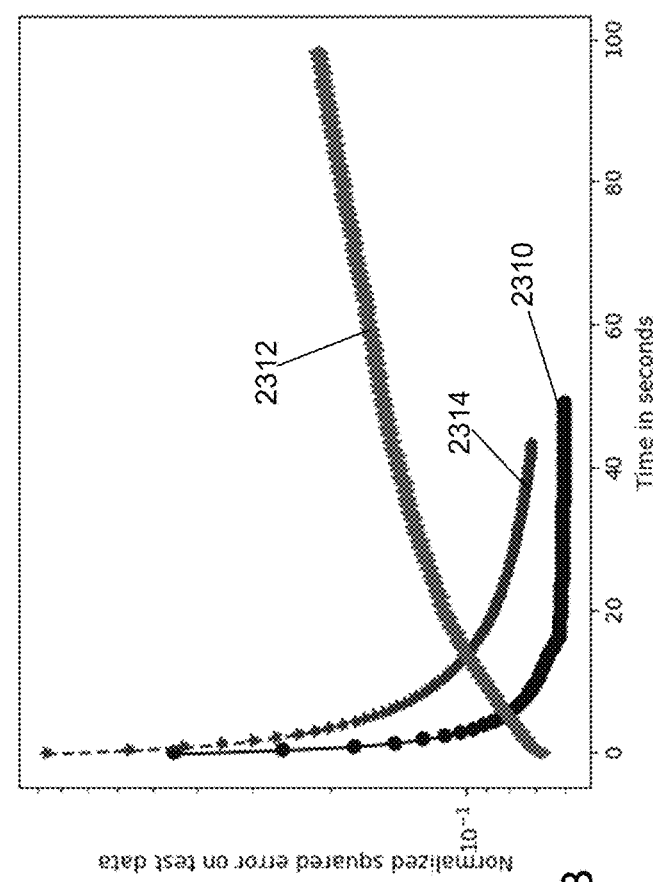
FIG. 23B shows a test error value comparison with the second data and the first input parameters in accordance with an illustrative embodiment.
Figure 23A:
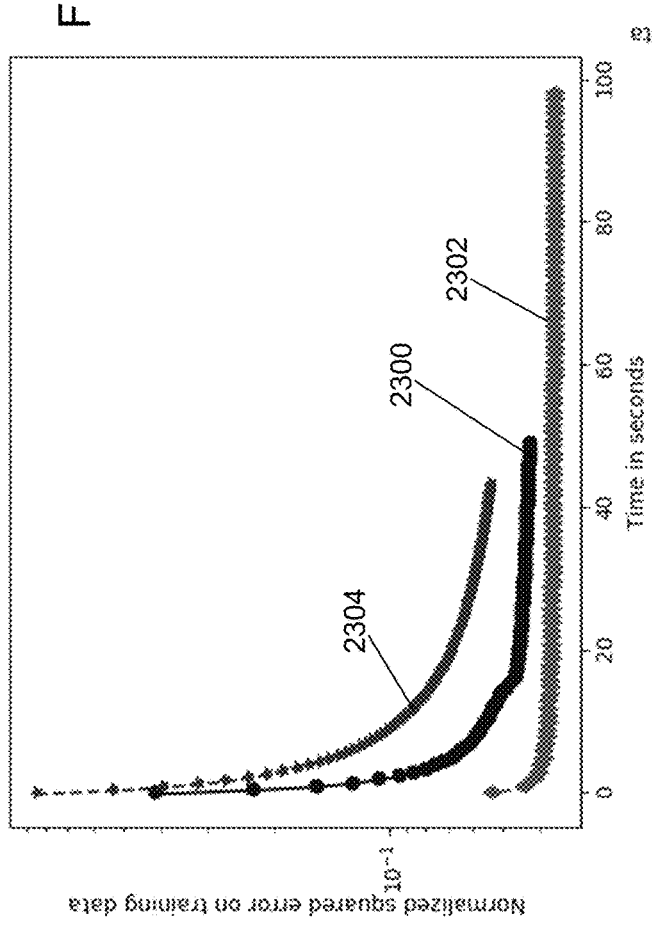
FIG. 23A shows a training objective function value comparison with the second data and twentieth input parameters in accordance with an illustrative embodiment.

Referring to FIG. 23A, a comparison of a normalized square error using the training data as a function of time is shown for the second dataset with $|F_2|=8$ and $\lambda=0.1$ and $n_{feat}=|F_1|+|F_2|+|F_3|=10$. A first curve 2300 was generated using recommendation application 122; a second curve 2302 was generated using ALS; and a third curve 2304 was generated using softImpute-ALS. Referring to FIG. 23B, a comparison of a normalized square error using the test data as a function of time is shown for $|F_2|=8$ and $\lambda=0.1$. A fourth curve 2310 was generated using recommendation application 122; a fifth curve 2312 was generated using ALS; and a sixth curve 2314 was generated using softImpute-ALS.

Figure 24B:
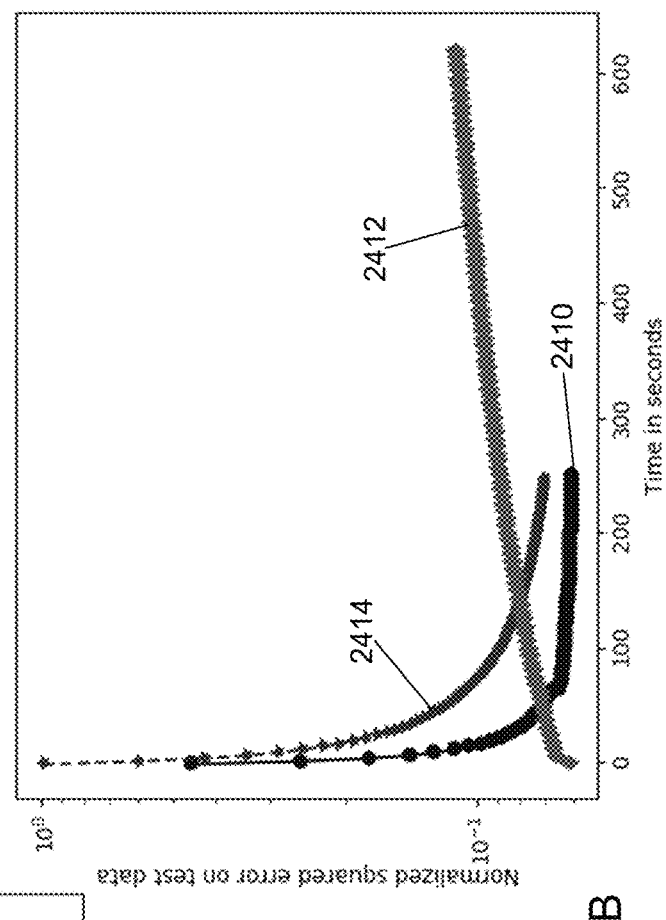
FIG. 24B shows a test error value comparison with the second data and the first input parameters in accordance with an illustrative embodiment.
Figure 24A:
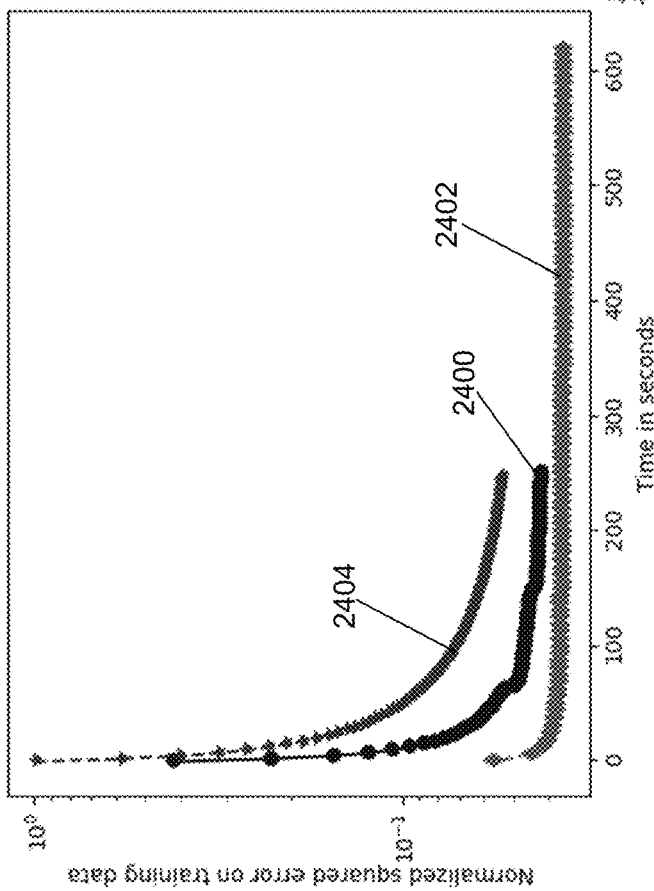
FIG. 24A shows a training objective function value comparison with the second data and twenty-first input parameters in accordance with an illustrative embodiment.

Referring to FIG. 24A, a comparison of a normalized square error using the training data as a function of time is shown for the second dataset with $|F_2|=8$ and $\lambda=1$ and $n_{feat}=|F_1|+|F_2|+|F_3|=10$. A first curve 2400 was generated using recommendation application 122; a second curve 2402 was generated using ALS; and a third curve 2404 was generated using softImpute-ALS. Referring to FIG. 24B, a comparison of a normalized square error using the test data as a function of time is shown for $|F_2|=8$ and $\lambda=1$. A fourth curve 2410 was generated using recommendation application 122; a fifth curve 2412 was generated using ALS; and a sixth curve 2414 was generated using softImpute-ALS.

Figure 25B:
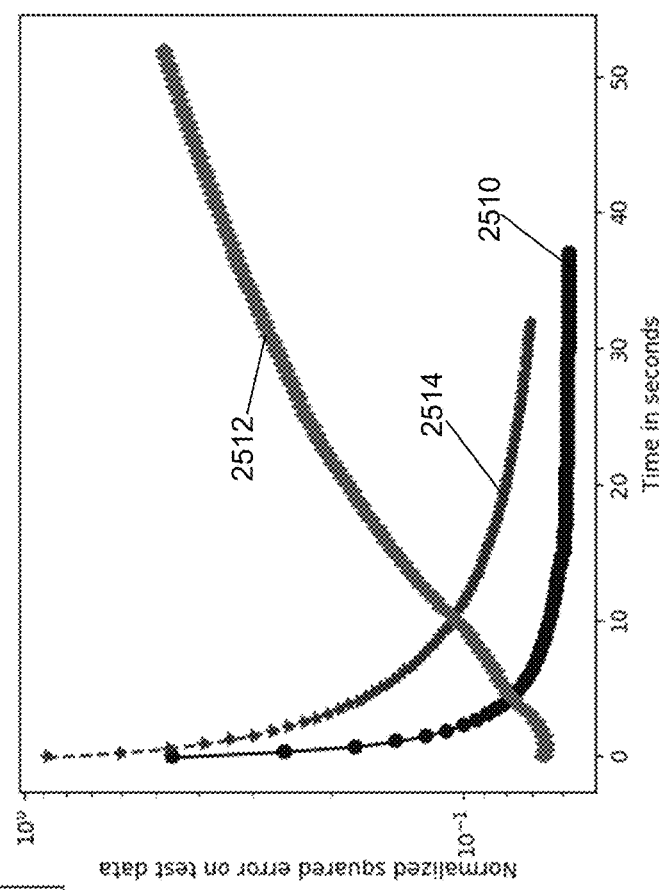
FIG. 25B shows a test error value comparison with the second data and the first input parameters in accordance with an illustrative embodiment.
Figure 25A:
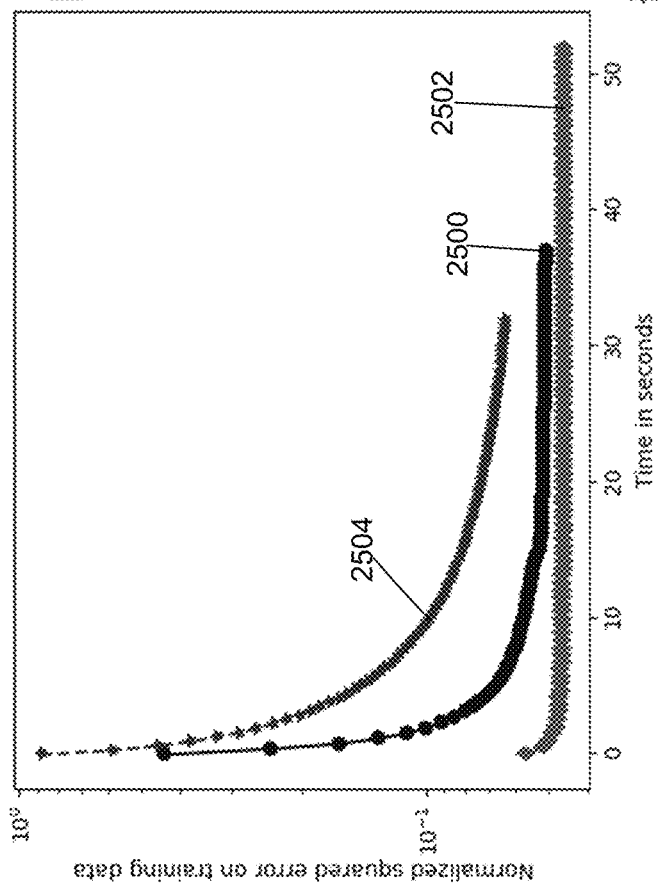
FIG. 25A shows a training objective function value comparison with the second data and twenty-second input parameters in accordance with an illustrative embodiment.

Referring to FIG. 25A, a comparison of a normalized square error using the training data as a function of time is shown for the second dataset with $|F_2|=3$ and $\lambda=0.01$ and $n_{feat}=|F_1|+|F_2|+|F_3|=5$. A first curve 2500 was generated using recommendation application 122; a second curve 2502 was generated using ALS; and a third curve 2504 was generated using softImpute-ALS. Referring to FIG. 25B, a comparison of a normalized square error using the test data as a function of time is shown for $|F_2|=3$ and $\lambda=0.01$. A fourth curve 2510 was generated using recommendation application 122; a fifth curve 2512 was generated using ALS; and a sixth curve 2514 was generated using softImpute-ALS.

Figure 26B:
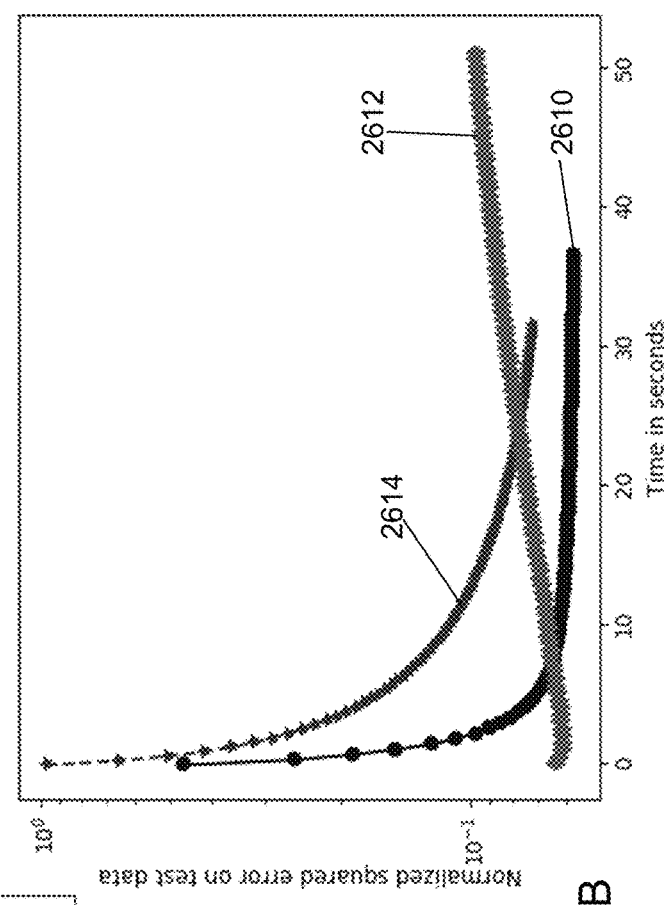
FIG. 26B shows a test error value comparison with the second data and the first input parameters in accordance with an illustrative embodiment.
Figure 26A:
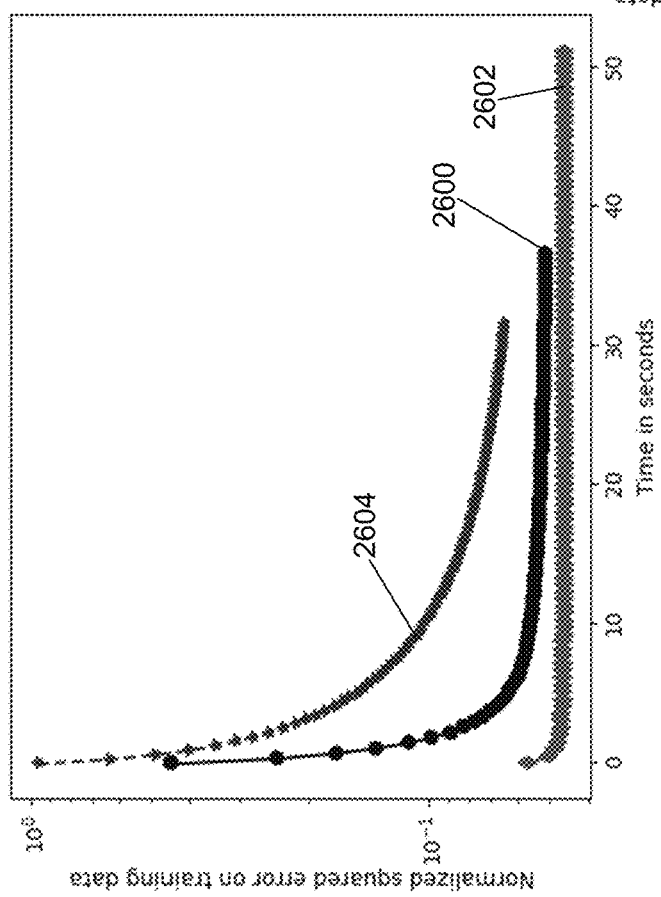
FIG. 26A shows a training objective function value comparison with the second data and twenty-third input parameters in accordance with an illustrative embodiment.

Referring to FIG. 26A, a comparison of a normalized square error using the training data as a function of time is shown for the second dataset with $|F_2|=3$ and $\lambda=0.1$ and $n_{feat}=|F_1|+|F_2|+|F_3|=5$. A first curve 2600 was generated using recommendation application 122; a second curve 2602 was generated using ALS; and a third curve 2604 was generated using softImpute-ALS. Referring to FIG. 26B, a comparison of a normalized square error using the test data as a function of time is shown for $|F_2|=3$ and $\lambda=0.1$. A fourth curve 2610 was generated using recommendation application 122; a fifth curve 2612 was generated using ALS; and a sixth curve 2614 was generated using softImpute-ALS.

Figure 27A:
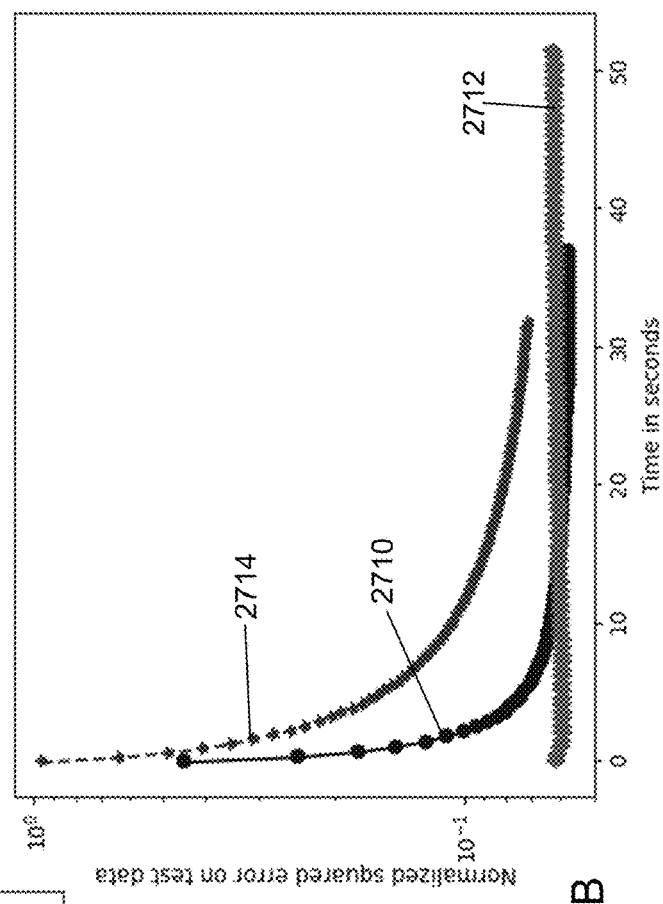
FIG. 27A shows a training objective function value comparison with the second data and twenty-fourth input parameters in accordance with an illustrative embodiment.
Figure 27B:
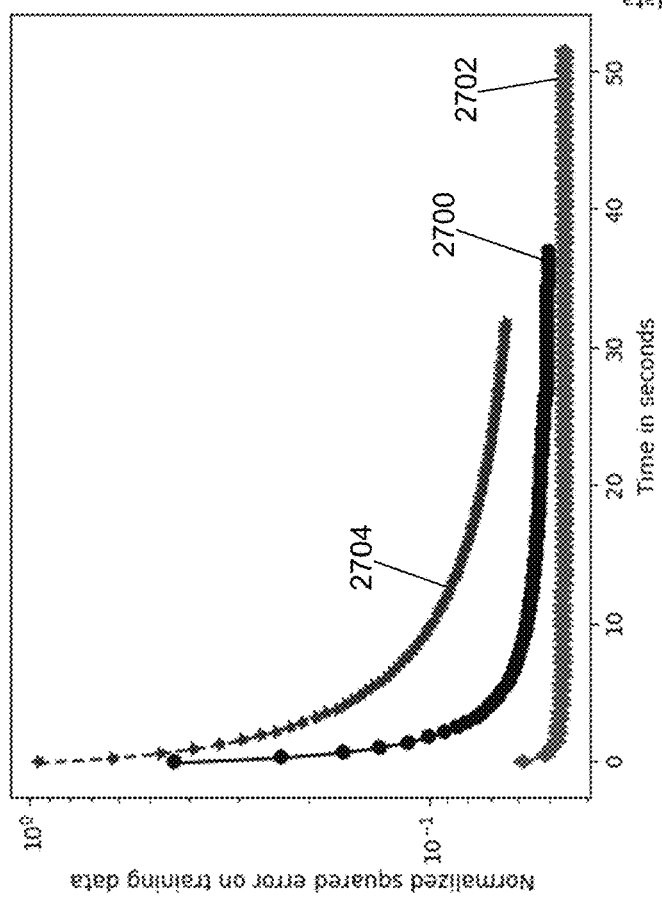
FIG. 27B shows a test error value comparison with the second data and the first input parameters in accordance with an illustrative embodiment.

Referring to FIG. 27A, a comparison of a normalized square error using the training data as a function of time is shown for the second dataset with $|F_2|=3$ and $\lambda=1$ and $n_{feat}=|F_1|+|F_2|+|F_3|=5$. A first curve 2700 was generated using recommendation application 122; a second curve 2702 was generated using ALS; and a third curve 2704 was generated using softImpute-ALS. Referring to FIG. 27B, a comparison of a normalized square error using the test data as a function of time is shown for $|F_2|=3$ and $\lambda=1$. A fourth curve 2710 was generated using recommendation application 122; a fifth curve 2712 was generated using ALS; and a sixth curve 2714 was generated using softImpute-ALS.

FIGS. 22A through 27B show that, across all experimental settings, ALS converged the fastest based on training error, followed by recommendation application 122 and then softImpute-ALS, which is similar to the second case using the synthetic data. ALS achieved the greatest drop in the first iteration, indicating the algorithm is overfitting to the training data. However, the test error of ALS exhibited a large variation and is heavily influenced by $\lambda$ and $|F_2|$. When the regularization was weak, the model produced by ALS deteriorated in generalization even though it was improving the training error, with this again signaling overfitting. As the regularization became stronger ($>\lambda$), the test error worsened at a lower speed. The overfitting of ALS was mitigated when a simpler model was fit to the training data. In particular, with $|F_2|$ decreased from 8 to 3 and the regularization increased to $\lambda=1$, the generalization performance of ALS was able to be maintained at a similar level to that of recommendation application 122.

In contrast to ALS, softImpute-ALS and recommendation application 122 exhibited great resistance to overfitting the second dataset. To explain this, the average number of training ratings is $$\frac{|\Omega|}{m} = 83$$

per user and $$\frac{|\Omega|}{n} = 135$$

per item, which are both much greater than $|F_2|$. Thus, the problems due to underdetermined were prevented using the second dataset in comparison to the synthetic data. Still, the training set may not have enough data for each user or item to support generalization. The fact that ALS independently solves for each user or item makes it sensitive to the data sufficiency at the level of users and items. SoftImpute-ALS and recommendation application 122 do not suffer from this because they simultaneously solve for all users or items. Through data augmentation, each user can exploit the data of similar users, and it is this information transfer that makes softImpute-ALS and recommendation application 122 resistant to data scarcity at the user or item level. As long as similar users (items) have enough data in total, the data can be utilized to the benefit of all users or items in question.

Recommendation application 122 is designed to learn MF-PDF models, a generalized version of matrix factorization to allow simultaneous update of bias terms and factor matrices. Recommendation application 122 builds upon softImpute-ALS, maintaining almost the same computational complexity and yet achieving greater objective improvement each iteration using the step-size parameters $\eta_1 \geq 1$ and $\eta_2 \geq 1$. The improvement is roughly proportional to the number of missing rating entries making recommendation application 122 approach ALS in making a large progress per iteration. This is combined with the low computational complexity per iteration. As a result, recommendation application 122 is able to outperform ALS and softImpute-ALS in most typical problem settings.

Figure 28:
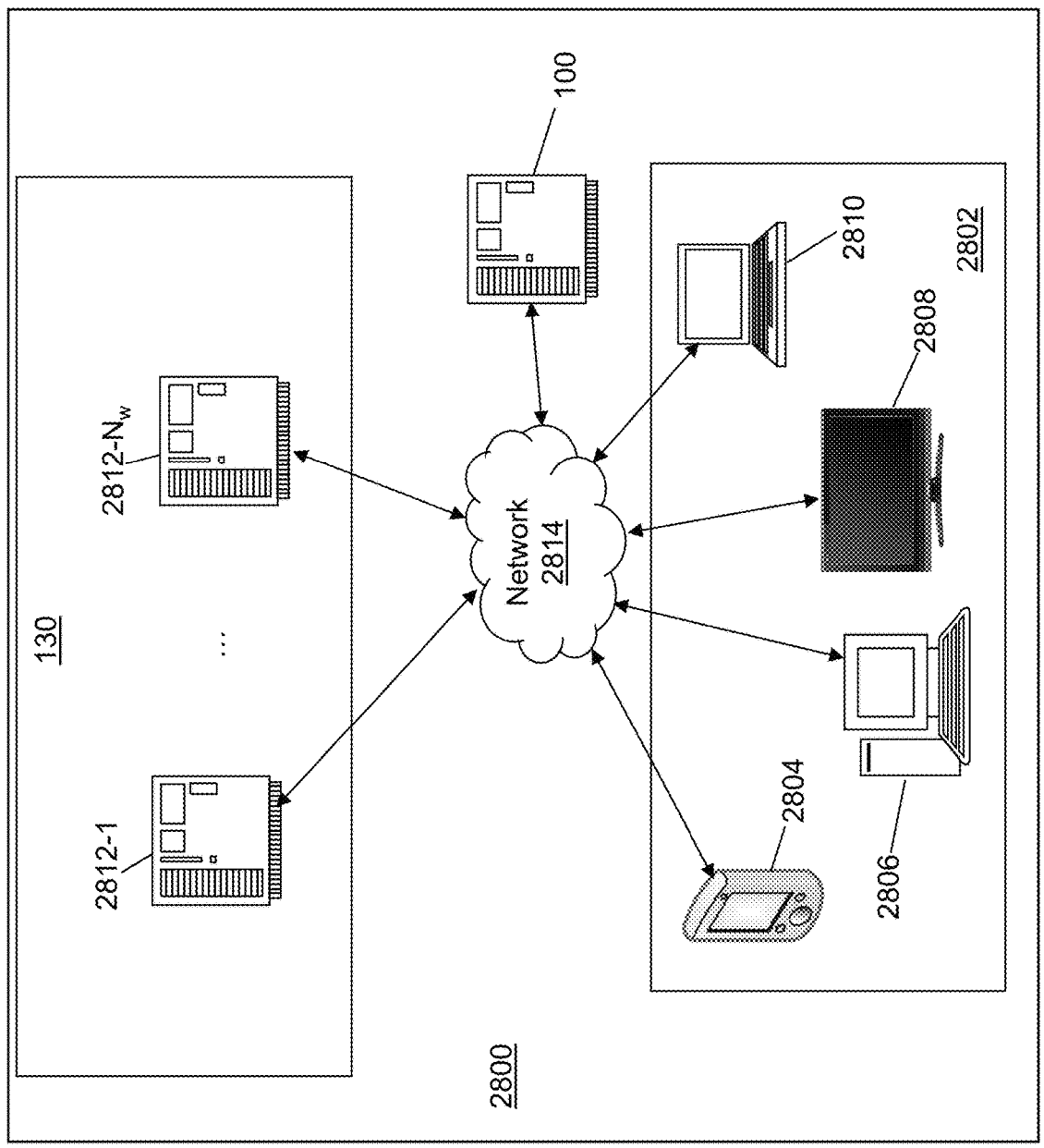
FIG. 28 depicts a block diagram of a recommendation system in accordance with an illustrative embodiment.

Referring to FIG. 28, a block diagram of a recommendation system 100 is shown in accordance with an illustrative embodiment. In an illustrative embodiment, recommendation system 100 may include a user system 2802, recommendation device 100, distributed computing system 130, and a network 2814. Each of user system 2802, recommendation device 100, and distributed computing system 130 may be composed of one or more discrete computing devices in communication through network 2814. Distributed computing system 130 may not be included in an alternative embodiment.

Network 2814 may include one or more networks of the same or different types. Network 2814 can be any type of wired and/or wireless public or private network including a cellular network, a local area network, a wide area network such as the Internet or the World Wide Web, etc. Network 2814 further may comprise sub-networks and consist of any number of communication devices.

The one or more computing devices of user system 2802 may include computing devices of any form factor such as a desktop 2806, a smart phone 2804, a television 2808, a laptop 2810, a personal digital assistant, an integrated messaging device, a tablet computer, etc. User system 2802 can include any number and any combination of form factors of computing devices that may be organized into subnets. The computing devices of user system 2802 may send and receive signals through network 2814 to/from recommendation device 100. The one or more computing devices of user system 2802 may communicate using various transmission media that may be wired and/or wireless as understood by those skilled in the art. The one or more computing devices of user system 2802 may be geographically dispersed from each other and/or co-located.

Figure 29:
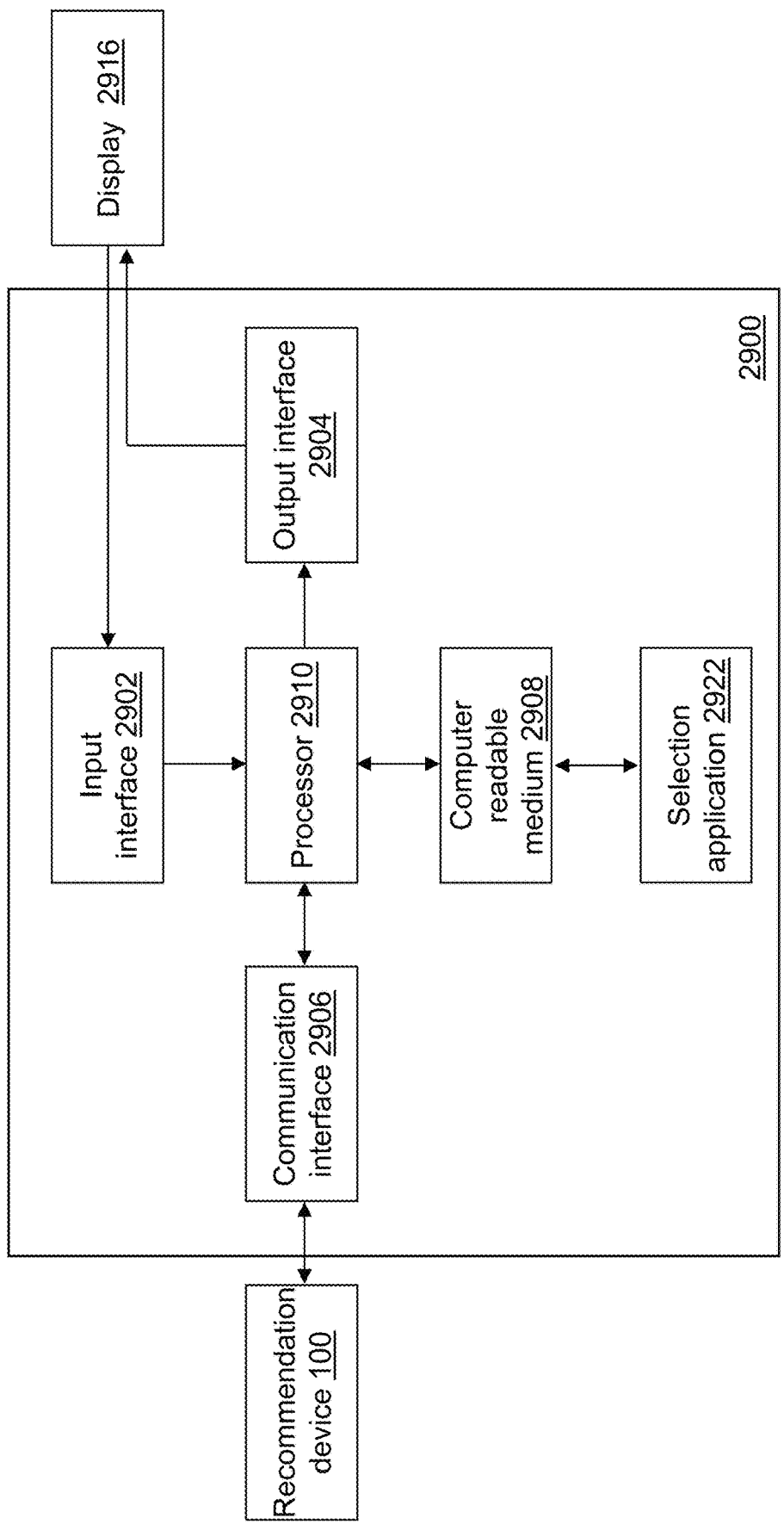
FIG. 29 depicts a block diagram of a user device of the recommendation system of FIG. 28 in accordance with an illustrative embodiment.

For illustration, referring to FIG. 29, a block diagram of a user device 2900 is shown in accordance with an example embodiment. User device 2900 is an example computing device of user system 2802. For example, each of desktop 2806, smart phone 2804, television 2808, and laptop 2810 may be an instance of user device 2900. User device 2900 may include a second input interface 2902, a second output interface 2904, a second communication interface 2906, a second non-transitory computer-readable medium 2908, a second processor 2910, and a selection application 2922. Each computing device of user system 2802 may be executing selection application 2922 of the same or different type. User device 2900 may execute selection application 2922 that triggers creation of model parameters 126. Each user device 2900 of user system 2802 may include the same or different components and combinations of components. Fewer, different, and additional components may be incorporated into user device 2900.

Second input interface 2902 provides the same or similar functionality as that described with reference to input interface 102 of recommendation device 100 though referring to user device 2900. Second output interface 2904 provides the same or similar functionality as that described with reference to output interface 104 of recommendation device 100 though referring to user device 2900. Second communication interface 2906 provides the same or similar functionality as that described with reference to communication interface 106 of recommendation device 100 though referring to user device 2900. Data and messages may be transferred between recommendation device 100 and user device 2900 using second communication interface 2906. Second computer-readable medium 2908 provides the same or similar functionality as that described with reference to computer-readable medium 108 of recommendation device 100 though referring to user device 2900. Second processor 2910 provides the same or similar functionality as that described with reference to processor 110 of recommendation device 100 though referring to user device 2900.

Selection application 2922 performs operations associated with requesting ratings data for a user (item) based on inputs provided from user device 2900. The operations may be implemented using hardware, firmware, software, or any combination of these methods. Referring to the example embodiment of FIG. 29, selection application 2922 is implemented in software (comprised of computer-readable and/or computer-executable instructions) stored in second computer-readable medium 2908 and accessible by second processor 2910 for execution of the instructions that embody the operations of selection application 2922. Selection application 2922 may be written using one or more programming languages, assembly languages, scripting languages, etc. Selection application 2922 may be implemented as a Web application.

Figure 30:
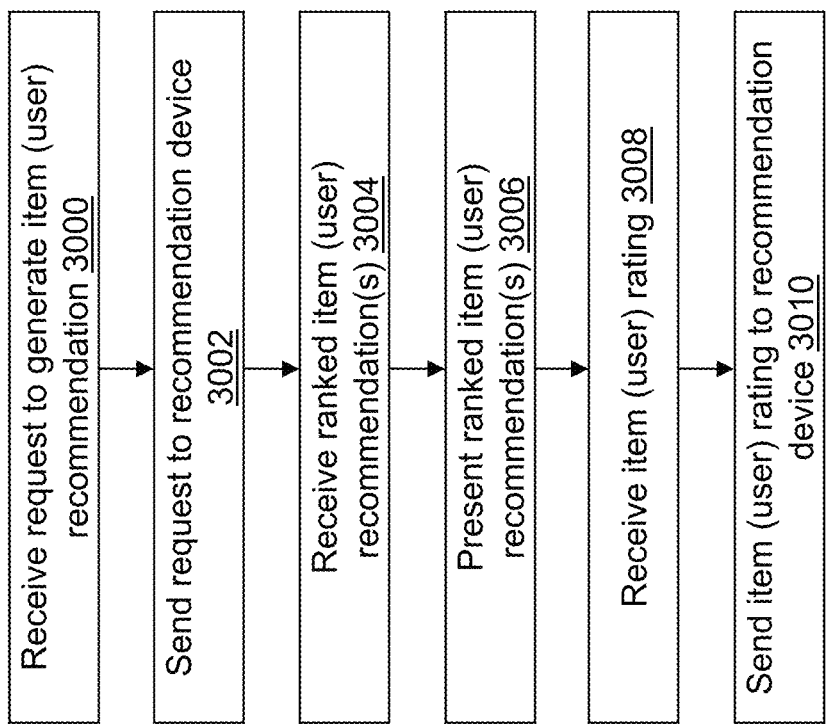
FIG. 30 depicts a flow diagram illustrating examples of operations performed by a selection application of the user device of FIG. 29 in accordance with an illustrative embodiment.

Referring to FIG. 30, example operations associated with selection application 2922 are described. Additional, fewer, or different operations may be performed depending on the embodiment of selection application 2922. The order of presentation of the operations of FIG. 30 is not intended to be limiting. Some of the operations may not be performed in some embodiments. Although some of the operational flows are presented in sequence, the various operations may be performed in various repetitions and/or in other orders than those that are illustrated. For example, a user may execute selection application 2922, which causes presentation of a first user interface window, which may include a plurality of menus and selectors such as drop-down menus, buttons, text boxes, hyperlinks, etc. associated with selection application 2922 as understood by a person of skill in the art. The plurality of menus and selectors may be accessed in various orders. For illustration, the Netflix application is an example selection application 2922.

In an operation 3000, a fifth indicator may be received that indicates a request to generate item recommendations for a user of selection application 2922. Alternatively, the request may be to generate user recommendations related to an item for an entity using selection application 2922. For example, a user may be searching for content such as a movie, book, game, music, etc. using selection application 2922. The request may include an identifier of the user for which recommendations are desired, or an identifier of the item for which recommendations are desired.

In an operation 3002, the request is sent to recommendation device 100 through second communication interface 2906, network 2814, and communication interface 106. In response to receipt of the request, recommendation device 100 may generate a ranked list of items using the matrices output to model parameters 126 in operation 232 that define a prediction ratings matrix M, where $M=XY=X_{:F_1}Y_{F_1:} + X_{:P}Y_{P:}=X_{:F_3}Y_{F_3:}+X_{:Q}Y_{Q:}$. For the user associated with the identifier included in the request, a row is selected from M and the ratings values for the items are sorted in descending order. One or more top-ranked items may be selected as the recommendation. Alternatively, when an item identifier is included in the request, a column is selected from M and the ratings values for the users are sorted in descending order and used to select top-ranked users. Recommendation device 100 may send a ranked item list or a ranked user list to user device 2900.

In an operation 3004, the ranked item list or the ranked user list is received from recommendation device 100.

In an operation 3006, the ranked item list or the ranked user list is presented, for example, using a second display 2916.

In an operation 3008, an item rating or a user rating may be received from the user.

In an operation 3010, the item rating or the user rating may be sent to recommendation device 100. In response, recommendation device 100 may update the ratings matrix with the new ratings information.

Recommendation application 122 is not limited to recommendation systems. For example, recommendation application 122 can be used on social networks, to predict interactions that have not yet occurred but can potentially happen. In this application, the rows and columns are both associated with people, and the entries are associated with interactions between people. Thus, R is an m×n matrix with $R_{ui}$ representing an interaction between a user u and an item i, where the user u represents a first person, the item i represents a second person, and the ratings matrix R represents interactions between the first person and the second person.

In another example, recommendation application 122 can be used for automatic completion of partially-filled surveys. In this application, each person provides answers to a list of questions, leading to a person-versus-question matrix. The person-versus-question matrix typically has heavily-missing entries, as people tend not to answer all of the questions as a matter of fact, many people may skip a lot of the questions. Using recommendation application 122, one can predict what answers a person would have given to the skipped questions. Thus, R is an m×n matrix with $R_{ui}$ representing an interaction between a user u and an item i, where the user u represents a survey participant, the item i represents a survey question, and the ratings matrix R represents answers by the survey participant to a respective survey question.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    (A) update a first parameter matrix using a first step-size parameter value that is greater than one and a first direction matrix, wherein the first parameter matrix includes a row dimension equal to a number of users of a plurality of users included in a ratings matrix, wherein the ratings matrix includes a missing matrix value, wherein the first parameter matrix is updated using $X_{:P}=X_{:P}+\eta_1 D$, where $X_{:P}$ is the first parameter matrix, $\eta_1$ is the first step-size parameter value, and D is the first direction matrix;
    (B) update a second parameter matrix using a second step-size parameter value that is greater than one and a second direction matrix, wherein the second parameter matrix includes a column dimension equal to a number of items of a plurality of items included in a ratings matrix;
    (C) update an objective function value based on the updated first parameter matrix and the updated second parameter matrix;
    (D) repeat (A) through (C) until the updated first parameter matrix and the updated second parameter matrix satisfy a convergence test;
    predict an interaction rating between a user of the plurality of users and an item of the plurality of items using the updated first parameter matrix and the updated second parameter matrix; and
    output the updated first parameter matrix and the updated second parameter matrix,
    wherein each item of the plurality of items is selected from the group consisting of a content item, a survey question, and a person, or each user of the plurality of users is selected from the group consisting of a person and an entity, or the interaction rating between the user of the plurality of users and the item of the plurality of items is selected from the group consisting of an item recommendation, a content recommendation, a contact person recommendation, and a survey answer recommendation.

2. The non-transitory computer-readable medium of claim 1, wherein the convergence test is based on a number of iterations of (C) exceeding a predefined maximum number of iterations.

3. The non-transitory computer-readable medium of claim 1, wherein the convergence test is based on the updated objective function value being less than or equal to a predefined convergence value.

4. The non-transitory computer-readable medium of claim 1, wherein the convergence test is based on a difference between the objective function value updated in (C) and the objective function value updated in a previous iteration of (C) being less than or equal to a predefined convergence value.

5. The non-transitory computer-readable medium of claim 1, wherein, after (D), the computer-readable instructions further cause the computing device to:
   receive a request to provide a ranked list of items for a user of the plurality of users, wherein the request includes a user identifier; and
   in response to receipt of the request,
   identify a row of a prediction matrix associated with the user identifier, wherein the prediction matrix is computed using $M = X_{:F_1} Y_{F_1:} + X_{:P} Y_{P:} = X_{:F_3} Y_{F_3:} + X_{:Q} Y_{Q:}$, where M is the prediction matrix, $Y_{Q:}$ is the second parameter matrix, $X_{:F_1}$ is a pre-defined user factors matrix, $Y_{F_3:}$ is a pre-defined item factors matrix, $X_{:F_3}$ is a pre-defined user regression matrix for $Y_{F_3:}$, $Y_{F_1:}$ is a pre-defined item regression matrix for $X_{:F_1}$, $Y_{P:}$ is a sub-matrix of Y obtained by extracting rows indexed by elements of a P matrix, Y is an item matrix, $P = F_2 \cup F_3$, $F_2$ is a latent matrix that stores latent indices for latent factors in X and Y, $F_3$ is an item index matrix that stores model indices for a linear model on Y, X is a user matrix, and $X_{:Q}$ is a sub-matrix of X obtained by extracting rows indexed by elements of a Q matrix, $Q = F_1 \cup F_2$, and $F_1$ is a user index matrix that stores model indices for a linear model on X;
   rank ratings included in the identified row from highest ratings value to lowest ratings value, wherein each rating of the ratings are the predicted interaction rating between the user and each respective item; and
   output a predefined number of items associated with the ranked ratings.

6. The non-transitory computer-readable medium of claim 1, wherein the first step-size parameter value is updated using $$\eta_1 = \frac{\alpha_1}{\beta_1},$$

where $\alpha_1$ is a first $\alpha$ parameter value, and $\beta_1$ is a first $\beta$ parameter value.

7. The non-transitory computer-readable medium of claim 6, wherein the first $\alpha$ parameter value is updated using $\alpha_1 = \Sigma_{(u,i)}(R_{ui} - X_{u:}Y_{:i})(D_{u:}Y_{Pi}) - \lambda tr(X_{:P}D)$, where u is an index to a user, i is an index to an item, $R_{ui}$ is a u, $i^{th}$ entry of the ratings matrix that is not a missing value, $X_{u:}$ is a $u^{th}$ row of X, X is a user matrix, $Y_{:i}$ is an $i^{th}$ column of Y, Y is an item matrix, $\lambda$ is a predefined regularization parameter value, $D_{u:}$ is a $u^{th}$ row of D, $Y_{Pi}$ is an $i^{th}$ column of $Y_{P:}$, $Y_{P:}$ is a sub-matrix of Y obtained by extracting rows indexed by elements of a P matrix, $P = F_2 \cup F_3$, $F_2$ is a latent matrix that stores latent indices for latent factors in X and Y, $F_3$ is an item index matrix that stores model indices for a linear model on Y, tr indicates a trace, and T indicates a transpose.

8. The non-transitory computer-readable medium of claim 7, wherein the first $\beta$ parameter value is updated using $\beta_1 = \Sigma_{(u,i)}(D_{u:}Y_{Pi})^2 - \lambda \|D\|^2$, where $\| \|$ indicates a Euclidean distance computation.

9. The non-transitory computer-readable medium of claim 1, wherein the first direction matrix is updated using $D = [(R - XY)Y_{P:}^T - \lambda X_{:P}](\lambda I + Y_{P:}Y_{P:}^T)^{-1}$, where R is the ratings matrix, X is a user matrix, Y is an item matrix, $\lambda$ is a predefined regularization parameter value, $Y_{P:}$ is a sub-matrix of Y obtained by extracting rows indexed by elements of a P matrix, $P = F_2 \cup F_3$, $F_2$ is a latent matrix that stores latent indices for latent factors in X and Y, $F_3$ is an item index matrix that stores model indices for a linear model on Y, I is an identity matrix, and T indicates a transpose.

10. The non-transitory computer-readable medium of claim 1, wherein the second parameter matrix is updated using $Y_{Q:} = Y_{Q:} + \eta_2 Z$, where $Y_{Q:}$ is the second parameter matrix, $\eta_2$ is the second step-size parameter value, and Z is the second direction matrix.

11. The non-transitory computer-readable medium of claim 10, wherein the second step-size parameter value is updated using $$\eta_2 = \frac{\alpha_2}{\beta_2},$$

where $\alpha_2$ is a second $\alpha$ parameter value, and $\beta_2$ is a second $\beta$ parameter value.

12. The non-transitory computer-readable medium of claim 11, wherein the second $\alpha$ parameter value is updated using $\alpha_2 = \Sigma_{(u,i)}(R_{ui} - X_{u:}Y_{:i})(X_{uQ}Z_{:i}) - \lambda tr(Y_{Q:}Z^T)$, where u is an index to a user, i is an index to an item, $R_{ui}$ is a u, $i^{th}$ entry of the ratings matrix that is not a missing value, $X_{u:}$ is a $u^{th}$ row of X, X is a user matrix, $Y_{:i}$ is an $i^{th}$ column of Y, Y is an item matrix, $\lambda$ is a predefined regularization parameter value, $Z_{:i}$ is an $i^{th}$ column of Z, $X_{uQ}$ is a $u^{th}$ row of $X_{:Q}$, $X_{:Q}$ is a sub-matrix of X obtained by extracting rows indexed by elements of a Q matrix, $Q = F_1 \cup F_2$, $F_2$ is a latent matrix that stores latent indices for latent factors in X and Y, $F_1$ is a user index matrix that stores model indices for a linear model on X, tr indicates a trace, and T indicates a transpose.

13. The non-transitory computer-readable medium of claim 12, wherein the second $\beta$ parameter value is updated using $\beta_2 = \Sigma_{(u,i)}(X_{uQ}Z_{:i})^2 - \lambda \|Z\|^2$, where $\| \|$ indicates a Euclidean distance computation.

14. The non-transitory computer-readable medium of claim 10, wherein the second direction matrix is updated using $Z = (\lambda I + X_{:Q}^T X_{:Q})^{-1}[X_{:Q}^T(R - XY) - \lambda Y_{Q:}]$, where R is the ratings matrix, X is a user matrix, Y is an item matrix, $\lambda$ is a predefined regularization parameter value, $X_{:Q}$ is a sub-matrix of X obtained by extracting rows indexed by elements of a Q matrix, $Q = F_1 \cup F_2$, $F_2$ is a latent matrix that stores latent indices for latent factors in X and Y, $F_1$ is a user index matrix that stores model indices for a linear model on X, I is an identity matrix, and T indicates a transpose.

15. The non-transitory computer-readable medium of claim 1, wherein the objective function value is updated using $g = \Sigma_{(u,i)}(R_{ui} - X_{u:}Y_{:i})^2 + \lambda(\|X_{:P}\|^2 + \|Y_{Q:}\|^2)$, where g is the objective function value, u is an index to a user, i is an index to an item, $R_{ui}$ is a u, $i^{th}$ entry of the ratings matrix that is not a missing value, $X_{u:}$ is indicates a $u^{th}$ row of X, X is a user matrix, $Y_{\cdot i}$ indicates an $i^{th}$ column of Y, Y is an item matrix, $\lambda$ is a predefined regularization parameter value, $Y_{Q\cdot}$ is the second parameter matrix, and $\|\ \|$ indicates a Euclidean distance computation.

16. A computing device comprising:
a processor; and
a non-transitory computer-readable medium operably coupled to the processor, the computer-readable medium having computer-readable instructions stored thereon that, when executed by the processor, cause the computing device to
(A) update a first parameter matrix using a first direction matrix and a first step-size parameter value that is greater than one, wherein the first parameter matrix includes a row dimension equal to a number of users of a plurality of users included in a ratings matrix, wherein the ratings matrix includes a missing matrix value, wherein the first parameter matrix is updated using $X_{\cdot P}=X_{\cdot P}+\eta_1 D$, where $X_{\cdot P}$ is the first parameter matrix, $\eta_1$ is the first step-size parameter value, and D is the first direction matrix;
(B) update a second parameter matrix using a second direction matrix and a second step-size parameter value that is greater than one, wherein the second parameter matrix includes a column dimension equal to a number of items of a plurality of items included in the ratings matrix;
(C) update an objective function value based on the updated first parameter matrix and the updated second parameter matrix;
(D) repeat (A) through (C) until the updated first parameter matrix and the updated second parameter matrix satisfy a convergence test;
predict an interaction rating between a user of the plurality of users and an item of the plurality of items using the updated first parameter matrix and the updated second parameter matrix; and
output the updated first parameter matrix and the updated second parameter matrix,
wherein each item of the plurality of items is selected from the group consisting of a content item, a survey question, and a person, or wherein each user of the plurality of users is selected from the group consisting of a person and an entity, or wherein the interaction rating between the user of the plurality of users and the item of the plurality of items is selected from the group consisting of an item recommendation, a content recommendation, a contact person recommendation, and a survey answer recommendation.

17. A method of determining a recommendation, the method comprising:
(A) updating, by a computing device, a first parameter matrix using a first direction matrix and a first step-size parameter value that is greater than one, wherein the first parameter matrix includes a row dimension equal to a number of users of a plurality of users included in a ratings matrix, wherein the ratings matrix includes a missing matrix value, wherein the first parameter matrix is updated using $X_{\cdot P}=X_{\cdot P}+\eta_1 D$, where $X_{\cdot P}$ is the first parameter matrix, $\eta_1$ is the first step-size parameter value, and D is the first direction matrix;
(B) updating, by the computing device, a second parameter matrix using a second direction matrix and a second step-size parameter value that is greater than one, wherein the second parameter matrix includes a column dimension equal to a number of items of a plurality of items included in the ratings matrix;
(C) updating, by the computing device, an objective function value based on the updated first parameter matrix and the updated second parameter matrix;
(D) repeating, by the computing device, (A) through (C) until the updated first parameter matrix and the updated second parameter matrix satisfy a convergence test;
predicting, by the computing device, an interaction rating between a user of the plurality of users and an item of the plurality of items using the updated first parameter matrix and the updated second parameter matrix; and
outputting, by the computing device, the updated first parameter matrix and the updated second parameter matrix,
wherein each item of the plurality of items is selected from the group consisting of a content item, a survey question, and a person, or wherein each user of the plurality of users is selected from the group consisting of a person and an entity, or wherein the interaction rating between the user of the plurality of users and the item of the plurality of items is selected from the group consisting of an item recommendation, a content recommendation, a contact person recommendation, and a survey answer recommendation.

18. The method of claim 17, wherein the first step-size parameter value is updated using $$\eta_1 = \frac{\alpha_1}{\beta_1},$$

where $\alpha_1$ is a first $\alpha$ parameter value, and $\beta_1$ is a first $\beta$ parameter value.

19. The method of claim 18, wherein the first $\alpha$ parameter value is updated using $\alpha_1 = \Sigma_{(u,i)}(R_{ui}-X_{u\cdot}Y_{\cdot i})(D_{u\cdot}Y_{Pi})-\lambda\text{tr}(X_{\cdot P}^T D)$, where u is an index to a user, i is an index to an item, $R_{ui}$ is a u, $i^{th}$ entry of the ratings matrix that is not a missing value, $X_{u\cdot}$ is a $u^{th}$ row of X, X is a user matrix, $Y_{\cdot i}$ is an $i^{th}$ column of Y, Y is an item matrix, $\lambda$ is a predefined regularization parameter value, $D_{u\cdot}$ is a $u^{th}$ row of D, $Y_{Pi}$ is an $i^{th}$ column of $Y_{P\cdot}$, $Y_{P\cdot}$ is a sub-matrix of Y obtained by extracting rows indexed by elements of a P matrix, $P=F_2 \cup F_3$, $F_2$ is a latent matrix that stores latent indices for latent factors in X and Y, $F_3$ is an item index matrix that stores model indices for a linear model on Y, tr indicates a trace, and T indicates a transpose.

20. The method of claim 19, wherein the first $\beta$ parameter value is updated using $\beta_1=\Sigma_{(u,i)}(D_{u\cdot}Y_{Pi})^2-\lambda\|D\|^2$, where $\|\ \|$ indicates a Euclidean distance computation.

21. The method of claim 17, wherein the first direction matrix is updated using $D=[(R-XY)Y_{P\cdot}^T-\lambda X_{\cdot P}](\lambda I+Y_{P\cdot}Y_{P\cdot}^T)^{-1}$, where R is the ratings matrix, X is a user matrix, Y is an item matrix, $\lambda$ is a predefined regularization parameter value, $Y_{P\cdot}$ is a sub-matrix of Y obtained by extracting rows indexed by elements of a P matrix, $P=F_2 \cup F_3$, $F_2$ is a latent matrix that stores latent indices for latent factors in X and Y, $F_3$ is an item index matrix that stores model indices for a linear model on Y, I is an identity matrix, and T indicates a transpose.

22. The method of claim 17, wherein the second parameter matrix is updated using $Y_{Q\cdot}=Y_{Q\cdot}+\eta_2 Z$, where $Y_{Q\cdot}$ is the second parameter matrix, $\eta_2$ is the second step-size parameter value, and Z is the second direction matrix.

23. The method of claim 22, wherein the second step-size parameter value is updated using $$\eta_2 = \frac{\alpha_2}{\beta_2},$$

where $\alpha_2$ is a second $\alpha_2$ parameter value, and $\beta_2$ is a second $\beta$ parameter value.

24. The method of claim 23, wherein the second $\alpha$ parameter value is updated using $\alpha_2 = \Sigma_{(u,i)}(R_{ui} - X_{u:}Y_{:i})(X_{uQ}Z_{:i}) - \lambda \text{tr}(Y_Q Z^T)$, where u is an index to a user, i is an index to an item, $R_{ui}$ is a u, $i^{th}$ entry of the ratings matrix that is not a missing value, $X_{u:}$ is a $u^{th}$ row of X, X is a user matrix, $Y_{:i}$ is an $i^{th}$ column of Y, Y is an item matrix, $\lambda$ is a predefined regularization parameter value, $Z_{:i}$ is an $i^{th}$ column of Z, $X_{uQ}$ is a $u^{th}$ row of $X_{:Q}$, $X_{:Q}$ is a sub-matrix of X obtained by extracting rows indexed by elements of a Q matrix, $Q = F_1 \cup F_2$, $F_2$ is a latent matrix that stores latent indices for latent factors in X and Y, $F_1$ is a user index matrix that stores model indices for a linear model on X, tr indicates a trace, and T indicates a transpose.

25. The method of claim 24, wherein the second $\beta$ parameter value is updated using $\beta_2 = \Sigma_{(u,i)}(X_{uQ}Z_{:i})^2 - \lambda \|Z\|^2$, where $\beta_2$ is the second $\beta$ parameter value, and $\| \|$ indicates a Euclidean distance computation.

26. The method of claim 25, wherein the second direction matrix is updated using $Z = (\lambda I + X_{:Q}^T X_{:Q})^{-1}[X_{:Q}^T(R - XY) - \lambda Y_{Q:}]$, where R is the ratings matrix, X is a user matrix, Y is an item matrix, $\lambda$ is a predefined regularization parameter value, $X_{:Q}$ is a sub-matrix of X obtained by extracting rows indexed by elements of a Q matrix, $Q = F_1 \cup F_2$, $F_2$ is a latent matrix that stores latent indices for latent factors in X and Y, $F_1$ is a user index matrix that stores model indices for a linear model on X, $Y_{Q:}$ is the second parameter matrix, I is an identity matrix, and T indicates a transpose.

27. The method of claim 17, wherein the objective function value is updated using $g = \Sigma_{(u,i)}(R_{ui} - X_{u:}Y_{:i})^2 + \lambda(\|X_{:P}\|^2 + \|Y_{Q:}\|^2)$, where g is the objective function value, u is an index to a user, i is an index to an item, $R_{ui}$ is a u, $i^{th}$ entry of the ratings matrix that is not a missing value, $X_{u:}$ indicates a $u^{th}$ row of X, X is a user matrix, $Y_{:i}$ indicates an $i^{th}$ column of Y, Y is an item matrix, $\lambda$ is a predefined regularization parameter value, $Y_{Q:}$ is the second parameter matrix, and $\| \|$ indicates a Euclidean distance computation.

28. The method of claim 17, wherein the convergence test is based on the updated objective function value being less than or equal to a predefined convergence value.

29. The method of claim 17, wherein the convergence test is based on a difference between the objective function value updated in (C) and the objective function value updated in a previous iteration of (C) being less than or equal to a predefined convergence value.

30. The method of claim 17, further comprising, after (D):
   receiving, by the computing device, a request to provide a ranked list of items for a user of the plurality of users, wherein the request includes a user identifier; and
   in response to receipt of the request,
      identifying, by the computing device, a row of a prediction matrix associated with the user identifier, wherein the prediction matrix is computed using $M = X_{:F_1}Y_{:F_1} + X_{:P}Y_{P:} = X_{:F_3}Y_{F_3} + X_{:Q}Y_{Q:}$, where M is the prediction matrix, $Y_{Q:}$ is the second parameter matrix, $X_{:F_1}$ is a pre-defined user factors matrix, $Y_{F_3:}$ is a pre-defined item factors matrix, $X_{:F_3}$ is a pre-defined user regression matrix for $Y_{F_3:}$, $Y_{F_1:}$ is a pre-defined item regression matrix for $X_{:F_1}$, $Y_{P:}$ is a sub-matrix of Y obtained by extracting rows indexed by elements of a P matrix, Y is an item matrix, $P = F_2 \cup F_3$, $F_2$ is a latent matrix that stores latent indices for latent factors in X and Y, $F_3$ is an item index matrix that stores model indices for a linear model on Y, X is a user matrix, and $X_{:Q}$ is a sub-matrix of X obtained by extracting rows indexed by elements of a Q matrix, $Q = F_1 \cup F_2$, and $F_1$ is a user index matrix that stores model indices for a linear model on X;
      ranking, by the computing device, ratings included in the identified row from highest ratings value to lowest ratings value, wherein each rating of the ratings are the predicted interaction rating between the user and each respective item; and
   outputting, by the computing device, a predefined number of items associated with the ranked ratings.

\* \* \* \* \*

UNITED STATES PATENT AND TRADEMARK OFFICE
CERTIFICATE OF CORRECTION

PATENT NO. : 11,379,743 B2
APPLICATION NO. : 17/386853
DATED : July 5, 2022
INVENTOR(S) : Xuejun Liao et al.

Page 1 of 1

It is certified that error appears in the above-identified patent and that said Letters Patent is hereby corrected as shown below:

In the Claims

Claim 7, Column 27, Line 61:
Delete the phrase "$\alpha_1 = \sum_{(u,i)}(R_{ui} - X_{u:}Y_{:i})(D_{u:}Y_{Pi}) - \Delta tr(X_{:P}{}^T D)$," and replace with
--$\alpha_1 = \sum_{(u,i)}(R_{ui} - X_{u:}Y_{:i})(D_{u:}Y_{Pi}) - \lambda tr(X_{:P}^T D)$,--.

Claim 9, Column 28, Lines 10-11:
Delete the phrase "$D = [(R - XY)Y_{P:}{}^T - \lambda X_{:P}](\lambda I + Y_{P:}Y_{P:}{}^T)^{-1}$," and replace with
--$D = [(R - XY)Y_{P:}^T - \lambda X_{:P}](\lambda I + Y_{P:}Y_{P:}^T)^{-1}$,--.

Claim 14, Column 28, Line 54:
Delete the phrase "$Z = (\lambda I + X_{:Q}{}^T X_{:Q})^{-1}[X_{:Q}{}^T(R - XY) - \lambda Y_{Q:}]$," and replace with
--$Z = (\lambda I + X_{:Q}^T X_{:Q})^{-1}[X_{:Q}^T(R - XY) - \lambda Y_{Q:}]$,--.

Claim 19, Column 30, Lines 36-37:
Delete the phrase "$\alpha_1 = \sum_{(u,i)}(R_{ui} - X_{u:}Y_{:i})(D_{u:}Y_{Pi}) - \lambda tr(X_{:P}{}^T D)$," and replace with
--$\alpha_1 = \sum_{(u,i)}(R_{ui} - X_{u:}Y_{:i})(D_{u:}Y_{Pi}) - \lambda tr(X_{:P}^T D)$,--.

Claim 21, Column 30, Lines 52-53:
Delete the phrase "$D = [(R - XY)Y_{P:}{}^1 - \lambda X_{:P}](\lambda I + Y_{P:}Y_{P:}{}^T)^{-1}$," and replace with
--$D = [(R - XY)Y_{P:}^T - \lambda X_{:P}](\lambda I + Y_{P:}Y_{P:}^T)^{-1}$,--.

Claim 26, Column 31, Lines 26-27:
Delete the phrase "$Z = (\lambda I + X_{:Q}{}^T X_{:Q})^{-1}[X_{:Q}{}^T(R - XY) - \lambda Y_{Q:}]$," and replace with
--$Z = (\lambda I + X_{:Q}^T X_{:Q})^{-1}[X_{:Q}^T(R - XY) - \lambda Y_{Q:}]$,--.

Signed and Sealed this
Twenty-seventh Day of December, 2022

Katherine Kelly Vidal
*Director of the United States Patent and Trademark Office*